US012359506B2

(12) United States Patent
Maxfield et al.

(10) Patent No.: US 12,359,506 B2
(45) Date of Patent: Jul. 15, 2025

(54) MULTIFUNCTION BUTTON FOR LADDER ADJUSTMENT

(71) Applicant: LITTLE GIANT LADDER SYSTEMS, LLC, Springville, UT (US)

(72) Inventors: B. Scott Maxfield, Mapleton, UT (US); N. Ryan Moss, Mapleton, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 0 days.

(21) Appl. No.: 18/490,715

(22) Filed: Oct. 19, 2023

(65) Prior Publication Data

US 2024/0044206 A1 Feb. 8, 2024

Related U.S. Application Data

(63) Continuation of application No. 18/324,971, filed on May 27, 2023.

(60) Provisional application No. 63/346,420, filed on May 27, 2022.

(51) Int. Cl.
*E06C 1/32* (2006.01)
*E06C 7/14* (2006.01)

(52) U.S. Cl.
CPC . *E06C 1/32* (2013.01); *E06C 7/14* (2013.01)

(58) Field of Classification Search
CPC ... E06C 1/32; E06C 1/38; E06C 1/383; E06C 7/082; E06C 7/14; E06C 7/50; E06C 9/085
See application file for complete search history.

(56) References Cited

U.S. PATENT DOCUMENTS 1,980,854 A * 11/1934 Eberle ........................ E06C 7/48 248/242
2,645,443 A * 7/1953 Pelletier .................. E06C 7/146 248/312
3,029,054 A * 4/1962 Mott .......................... E06C 7/14 248/211
4,085,899 A * 4/1978 Boothe ...................... B02C 7/13 241/261.3
4,171,117 A * 10/1979 Prochaska ............ A47G 1/1613 248/495
4,210,224 A 7/1980 Kummerlin et al.
(Continued)

FOREIGN PATENT DOCUMENTS

CN 2081878 U 7/1991
CN 104986086 A 10/2015
EP 1063387 A2 12/2000

OTHER PUBLICATIONS

International Search Report and Written Opinion mailed Aug. 18, 2023 as received in PCT/US2023/023784.

*Primary Examiner* — Daniel P Cahn
*Assistant Examiner* — Shiref M Mekhaeil
(74) *Attorney, Agent, or Firm* — Dorsey & Whitney LLP

(57) ABSTRACT

Ladders have first and second assemblies with pairs of rails that form a pair of hinges rotatable about a pivot axis. The hinges include at least one retainer movable between axial positions along the pivot axis. The at least one retainer includes a body and a support arm coupled with the body. The arm can be pivotable relative to the body between a deployed position and a collapsed position. The support arm can support objects while a user is in an elevated position on the ladder.

13 Claims, 16 Drawing Sheets

(56) References Cited

U.S. PATENT DOCUMENTS

| | | | | | |
|---|---|---|---|---|---|
| 4,216,844 | A * | 8/1980 | Klafs | E05D 11/1007 | 16/329 |
| 4,407,045 | A * | 10/1983 | Boothe | E05D 11/1007 | 403/92 |
| D272,211 | S * | 1/1984 | Rock | D8/323 | |
| 4,560,127 | A * | 12/1985 | Ippolito | E06C 7/14 | 248/210 |
| 4,566,150 | A * | 1/1986 | Boothe | E05D 11/1007 | 16/349 |
| 4,666,327 | A * | 5/1987 | Su | E06C 1/32 | 16/329 |
| 4,666,328 | A * | 5/1987 | Ryu | E06C 1/32 | 403/92 |
| 4,697,305 | A * | 10/1987 | Boothe | E06C 1/32 | 16/349 |
| 4,824,278 | A * | 4/1989 | Chang | F16C 11/10 | D25/64 |
| 4,890,950 | A * | 1/1990 | Yoo | F16C 11/10 | 182/163 |
| 5,026,016 | A * | 6/1991 | Lisowski | F16B 21/09 | 248/314 |
| 5,054,170 | A * | 10/1991 | Otrusina | A45F 5/02 | 24/669 |
| 5,388,741 | A * | 2/1995 | Hillinger | A45F 5/02 | 206/349 |
| 5,620,272 | A * | 4/1997 | Sheng | E05D 11/1007 | 403/92 |
| 5,954,157 | A * | 9/1999 | Grimes | E06C 7/08 | 16/329 |
| 6,115,886 | A * | 9/2000 | Fujita | H01Q 1/084 | 343/702 |
| 6,142,892 | A * | 11/2000 | Dennis | A63B 63/004 | 473/477 |
| 6,244,779 | B1 * | 6/2001 | Slasinski | F16C 11/10 | 403/92 |
| 6,330,733 | B1 * | 12/2001 | Rauschenberger | E06C 1/32 | 16/326 |
| 6,343,406 | B1 * | 2/2002 | Yeh | E06C 1/32 | 182/163 |
| D454,481 | S * | 3/2002 | DeLine | D8/373 | |
| 6,711,780 | B2 * | 3/2004 | Lee | E06C 1/32 | 16/334 |
| D492,187 | S * | 6/2004 | Mottini | D8/354 | |
| 6,769,660 | B2 * | 8/2004 | DeLine | A47G 1/1633 | 248/542 |
| 6,866,940 | B1 * | 3/2005 | Laughlin | E06B 7/28 | 248/225.11 |
| D507,959 | S * | 8/2005 | Mottini | D8/354 | |
| 7,047,597 | B2 * | 5/2006 | Lee | E06C 1/32 | 16/233 |
| 7,077,372 | B2 * | 7/2006 | Moran | A61B 90/39 | 248/221.11 |
| 7,093,321 | B2 * | 8/2006 | Burbrink | E06C 1/32 | 182/163 |
| 7,114,592 | B1 | 10/2006 | Gibson et al. | | |
| 7,117,566 | B1 * | 10/2006 | Ewing | A45F 5/02 | 24/3.12 |
| 7,140,072 | B2 * | 11/2006 | Leng | E06C 1/32 | 16/326 |
| D560,221 | S * | 1/2008 | Hoglan | D14/451 | |
| 7,424,933 | B2 * | 9/2008 | Weiss | E06C 7/084 | 182/163 |
| 7,540,806 | B2 * | 6/2009 | Tastad | G07F 17/3213 | 273/145 E |
| 8,011,071 | B2 * | 9/2011 | O'Brien | A61M 16/1075 | 248/221.11 |
| 8,186,481 | B2 | 5/2012 | Moss et al. | | |
| 8,353,649 | B2 * | 1/2013 | Csik | F16B 39/284 | 411/908 |
| 9,173,475 | B2 * | 11/2015 | Blechman | A45F 5/02 | |
| 9,850,936 | B2 * | 12/2017 | Tanabe | F16B 37/02 | |
| D818,801 | S * | 5/2018 | Ng | D8/354 | |
| 10,470,556 | B1 * | 11/2019 | Choi | G01B 3/1041 | |
| 10,487,580 | B2 * | 11/2019 | Miao | E05D 11/06 | |
| 10,718,160 | B2 * | 7/2020 | Leng | E06C 1/10 | |
| 11,191,373 | B2 * | 12/2021 | Ng | A47G 1/1606 | |
| 11,441,356 | B2 * | 9/2022 | Maxfield | E06C 7/14 | |
| 11,505,994 | B2 * | 11/2022 | Foley | E06C 1/22 | |
| 11,559,131 | B1 * | 1/2023 | Blevins | A45F 5/02 | |
| 11,661,794 | B2 * | 5/2023 | Beaulieu | E04G 1/15 | 182/206 |
| 2003/0012595 | A1 * | 1/2003 | Park | E06C 1/32 | 403/84 |
| 2003/0037412 | A1 * | 2/2003 | Lee | E06C 1/32 | 16/326 |
| 2005/0252721 | A1 * | 11/2005 | Parker | E06C 1/393 | 182/165 |
| 2005/0268434 | A1 * | 12/2005 | Burbrink | E06C 1/32 | 16/324 |
| 2005/0284909 | A1 * | 12/2005 | Munoz | B25H 3/00 | 224/904 |
| 2006/0186304 | A1 * | 8/2006 | McGee | A47G 1/1606 | 248/476 |
| 2008/0283563 | A1 * | 11/2008 | O'Donnell | A45F 5/02 | 224/269 |
| 2009/0229918 | A1 * | 9/2009 | Moss | E06C 1/30 | 182/180.1 |
| 2018/0184791 | A1 * | 7/2018 | Davis | A45F 5/021 | |
| 2018/0274296 | A1 * | 9/2018 | Foley | E06C 1/18 | |
| 2019/0234144 | A1 * | 8/2019 | Badowski | E06C 1/06 | |
| 2019/0383099 | A1 * | 12/2019 | Yeh | F16C 11/10 | |
| 2023/0008962 | A1 * | 1/2023 | Zhu | E06C 1/16 | |
| 2023/0228148 | A1 * | 7/2023 | Li | E06C 1/18 | 182/23 |

* cited by examiner

MULTIFUNCTION BUTTON FOR LADDER ADJUSTMENT

CROSS-REFERENCE TO RELATED APPLICATIONS

This application is a continuation of U.S. patent application Ser. No. 18/324,971, filed on 27 May 2023 and entitled, “MULTIFUNCTION BUTTON FOR LADDER ADJUSTMENT,” which claims priority to U.S. Provisional Patent Application No. 63/346,420, filed on 27 May 2022 and entitled, “MULTIFUNCTION BUTTON FOR LADDER ADJUSTMENT,” the disclosure of which is incorporated herein in its entirety by this reference.

TECHNICAL FIELD

The present disclosure generally relates to ladders and, more particularly, components for adjusting ladders while also providing other functionality.

BACKGROUND

Ladders are conventionally utilized to provide a user with improved access to elevated locations that might otherwise be inaccessible. Ladders come in many shapes and sizes, such as straight ladders, extension ladders, stepladders, and combination step and extension ladders. Combination ladders and articulating ladders may incorporate, in a single ladder, many of the benefits of multiple types of ladder designs.

Straight ladders, extension ladders or combination ladders (when configured as straight or an extension ladder), are ladders that are conventionally positioned against an elevated surface, such as a wall or the edge of a roof, to support the ladder at a desired angle. A user then ascends the ladder to obtain access to an elevated area, such as to an upper area of the wall or access to the roof. A pair of feet or pads, one being coupled to the bottom of each side rail, is conventionally used to engage the ground, a floor or some other supporting surface.

Step ladders/freestanding ladders and combination ladders (when configured as a step ladder/freestanding ladder) are generally considered to be self-supporting in that they include a first rail assembly which includes steps or rungs that is coupled to a second rail assembly or other support structure. The first and second rail assemblies are typically positioned at an acute angle relative to each other so that there are multiple feet or support members—at least three, but typically four—to support the ladder in a free standing position. Thus, the ladder rungs may be climbed to an elevated position without the need to lean the ladder against a wall or other vertical support structure.

There is a constant need for improvements to the utility and user experience provided by ladders, scaffolds, and related assemblies.

SUMMARY

One aspect of the present disclosure relates to a ladder comprising: a first assembly, including: a first pair of rails spaced apart from each other; a first set of rungs coupled to and extending between the pair of rails; a first pair of hinge portions coupled to the first pair of rails; and a second assembly, including: a second pair of rails spaced apart from each other; a second pair of hinge portions coupled to the second pair of rails; wherein the first pair of hinge portions and the second pair of hinge portions are pivotally coupled to each other to form a pair of hinges rotatable about a pivot axis; and at least one retainer movable between a first axial position along the pivot axis and a second axial position along the pivot axis, the first assembly being rotatable relative to the second assembly while the at least one retainer is in the first axial position, the first assembly being prevented from rotation relative to the second assembly by the at least one retainer while the at least one retainer is in the second axial position; wherein the at least one retainer includes: a body; and a support arm coupled with and extending from the body.

In some embodiments, the at least one retainer comprises a pin portion extending from the body into at least one of the pair of hinges.

In some embodiments, the body is reversibly removable from the pin portion.

In some embodiments, the support arm is pivotable relative to the body between a deployed position and a collapsed position.

In some embodiments, the support arm is selectively biased into the deployed position and into the collapsed position.

In some embodiments, the deployed position is substantially perpendicularly offset from the collapsed position.

In some embodiments, the body comprises a protrusion limiting rotation away from the deployed position while the support arm is in the collapsed position.

In some embodiments, the support arm is substantially aligned with a plane perpendicular to the pivot axis while in the collapsed position.

In some embodiments, the at least one retainer is movable between the first axial position and the second axial position in response to application of an axially-oriented force to a substantially axially-facing surface of the body.

In some embodiments, the support arm forms a loop with the body while in the deployed position.

In some embodiments, the loop includes at least three linear segments.

In some embodiments, the body comprises at least one support surface engaging a downward-facing surface the support arm while the support arm is in the deployed position.

In some embodiments, the at least one support surface is pitched toward a centerline of the body.

In some embodiments, the first pair of rails and the second pair of rails are movable relative to the pivot axis between at least a freestanding configuration and a collapsed configuration.

In some embodiments, while the first pair of rails and the second pair of rails are in the freestanding configuration on a substantially horizontal support surface, the support arm extends substantially horizontally relative to the substantially horizontal support surface.

In some embodiments, a top surface of the body comprises at least one aperture extending perpendicular to the pivot axis.

In some embodiments, the support arm is pivotable about an axis perpendicular to the pivot axis.

Another aspect of the disclosure relates to a button for a locking mechanism, the button comprising: a body having a first side surface, a second side surface positioned opposite the first side surface, and at least one lateral surface extending between the first side surface and the second side surface; a support arm coupled with the body and pivotable relative to the body about a pivot axis intersecting the at least one lateral surface, the support arm being pivotable about the pivot axis between a deployed position and a collapsed position; wherein in the collapsed position, the support arm lies between a first plane defined by the first side surface of the body and a second plane defined by the second side surface of the body; and wherein in the deployed position, the support arm extends from the second side surface in a direction extending away from the first side surface. The button may be directly coupled with an adjustment mechanism of a ladder.

Another aspect of the disclosure relates to a button for a locking mechanism, the button comprising: a body having a first side surface attachable to a shaft, a second side surface positioned opposite the first side surface, and at least one lateral surface extending between the first side surface and the second side surface; a support arm coupled with the body and pivotable relative to the body about a pivot axis intersecting the at least one lateral surface, the support arm being pivotable about the pivot axis between a deployed position and a collapsed position; wherein in the deployed position, a substantially upward-facing portion of the at least one lateral surface limits rotation of the support arm about the pivot axis.

The above summary of the present invention is not intended to describe each embodiment or every implementation of the present invention. The figures and the detailed description that follow more particularly exemplify one or more preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
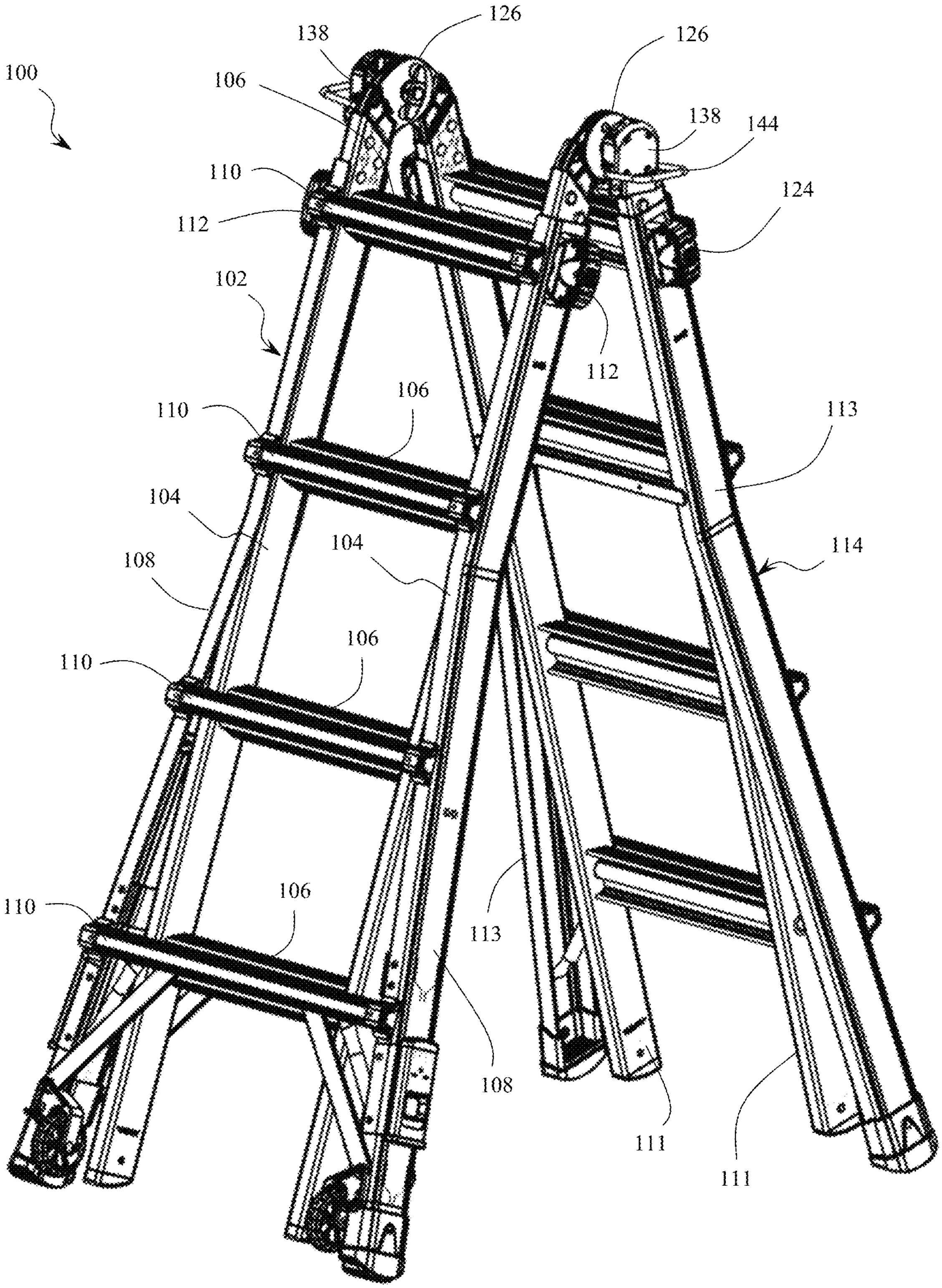
FIG. 1 is a perspective view of a ladder in a freestanding configuration.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Users of a ladder often carry tools and other objects to be used in an elevated position. For example, painters often carry brushes, paint cans, knives, power tools, and similar objects for use while standing on the rungs. Construction workers often carry power tools, fasteners, and other materials with them on the ladder.

Articulating ladders and convertible/combination-type ladders typically lack convenient areas for supporting these objects, especially if there is no top cap or other platform area extending between the rail assemblies or rungs. However, the hinges and locking mechanisms of adjustable ladders and combination ladders are typically within reach of the user while in the elevated position due to their positioning near the top end of the ladder when in a step ladder/freestanding ladder state and due to their positioning near the center of the ladder's vertical length when in an extension ladder/straight ladder state. Furthermore, locking mechanisms that secure inner rails relative to outer rails of a front assembly or rear assembly are often also user accessible while in an elevated position.

Aspects of the present disclosure relate to ladders and buttons attached to ladders that are configured to add functionality to the locking mechanisms of the ladders by providing a support arm (e.g., a loop, a tray, rod, hook, or similar support structure) for bearing the weight of tools, fasteners, and other objects in an elevated position while the ladder is used in a freestanding state or extension state. The support arms can be stationary parts of the buttons such as hooks, loops, cupholders, or similar structures integrated into the bodies of the buttons and not repositionable relative to the bodies. In some embodiments, the support arms can be movable between collapsed positions that minimize the outer profile of the ladder and deployed positions that extend from the ladder (e.g., laterally away along the ladder's hinge pivot axis) and are convenient for supporting objects while in those positions. In any case, the support arms can form openings for receiving tool handles, distal ends of power tools, cups, fasteners, and other elongated shafts or tool bodies while broader parts of the objects are supported by the top surfaces of the support arm.

The support arm can be configured to resist detachment from the body of the button and can be configured to minimize breakage of the support arm if the ladder tips over onto the support arm or button. The support arm can also provide features for biasing the support arm in the collapsed and deployed positions to improve stability of the support arm and to help guide the user. Other features of the button can ease in the assembly and durability of the body and support arm.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Referring to FIG. 1, an articulating ladder 100 is shown. The articulating ladder 100 includes a first rail assembly 102 including an inner assembly slidably coupled with an outer assembly. The inner assembly includes a pair of spaced apart rails 104 coupled with a plurality of rungs 106. Likewise, the outer assembly includes a pair of spaced apart rails 108 coupled to a plurality of rungs 110. The rails 104 of the inner assembly are slidably coupled with the rails 106 of the outer assembly. The inner and outer assemblies and may be selectively locked relative to each other via locking mechanisms 112 such that one or more of their respective rungs 106 and 110 are aligned with each other. A locking mechanism 112 may be configured to engage a portion of the inner rail assembly and the outer rail assembly so as to selectively lock the two assemblies relative to each other. While a locking mechanism 112 may be provided on each side of the ladder 100, and, in some cases, both locking mechanisms 112 may need to be unlocked to move rails of the inner assembly relative to rails of the outer assembly. Buttons and related assemblies described herein may be used with locking mechanisms 112.

The articulating ladder 100 also includes a second rail assembly 114 that includes an inner assembly slidably coupled with an outer assembly. The inner assembly includes a pair of rails 111 coupled with a plurality of rungs and is configured similar to the inner assembly of the first rail assembly described above. Likewise, the outer assembly includes a pair of rails 113 coupled with a plurality of rungs and is configured similar to the outer assembly of the first rail assembly described hereinabove. Locking mechanisms 124 may be associated with inner and outer assemblies and to enable selective positioning of the inner assembly relative to the outer assembly as described above with respect to the first rail assembly 102. In some embodiments, the locking mechanisms 124 (or 112) may be adjustment mechanisms used to adjustably retain components to the ladder 100, such as accessories, tools, and other apparatuses. Thus, the locking mechanisms may be used for purposes other than locking rails or hinges and may be used to adjust the positioning of components on the ladder.

One exemplary locking mechanism that may be used with the first and second rail assemblies 102 and 114 is described in U.S. Pat. No. 8,186,481, issued May 29, 2012, the disclosure of which is incorporated by reference herein in its entirety. While the locking mechanism described in U.S. Pat. No. 8,186,481 is generally described in conjunction with an embodiment of an adjustable step ladder, such a locking mechanism may by readily used with an embodiment such as the presently described combination ladder as well. It is additionally noted that, in one embodiment, the rail assemblies 102 and 114 may be configured similar to those which are described in U.S. Pat. No. 4,210,224 to Kummerlin, the disclosure of which is incorporated by reference in its entirety. Other configurations of rail assemblies may be utilized.

The first rail assembly 102 and the second rail assembly 114 are coupled to each other by way of a pair hinge mechanisms 126. Each hinge mechanism 126 may include a first hinge component (e.g., 132) coupled with a rail 104 of the first rail assembly's inner assembly and a second hinge component (e.g., 134) coupled with a corresponding rail of the second rail assembly's inner assembly. The hinge components of each hinge mechanism 126 rotate about a pivot member (e.g., pivot pin 128 or sleeve 130 having a central longitudinal pivot axis extending laterally through the hinge mechanisms 126 in FIGS. 2, 4, and 5) such that the first rail assembly 102 and the second rail assembly 114 may pivot relative to each other between different angles defined between the first and second rail assemblies. Additionally, the hinge mechanisms 126 may be configured to lock their respective hinge components (and, thus, the associated rails to which they are coupled) at desired angles relative to each other. One example of a suitable hinge mechanism is described in U.S. Pat. No. 4,407,045 to Boothe, the disclosure of which is incorporated by reference herein in its entirety. Other configurations of hinge mechanisms are also contemplated and can be used, as will be appreciated by those having ordinary skill in the art and the benefit of the present disclosure.

The articulating ladder 100 can be constructed so as to assume a variety of states or configurations. For example, using the locking mechanisms (112 or 124) to adjust a rail assembly (102 or 114) enables the ladder 100 to adjust in height. More specifically, considering the first rail assembly 102, as the rail assembly 102 is adjusted, with the outer assembly being displaced relative to the inner assembly, the associated locking mechanisms 112 engage the inner and outer assemblies when they are at desired relative positions with the rungs (106 and 110) of the inner and outer assemblies at a desired vertical spacing relative to each other. At some of the adjustment heights of the rail assembly 102, at least some of their respective rungs (106 and 110) align with each other (such as shown in FIG. 1). The second rail assembly 114 may be adjusted in a similar manner.

Considering the embodiment shown in FIG. 1, adjustment of the rail assemblies 102 and 114 enables the ladder 100 to be configured as a step ladder with, for example, four effective rungs at a desired height (as shown in FIG. 1), or to be configured as a step ladder that is substantially taller having five, six, seven, or eight effective rungs, depending on the relative positioning of the inner and outer assemblies. However, it is noted that the inner and outer rail assemblies may be configured with more or fewer rungs than four. It is also noted that the first rail assembly 102 and the second rail assembly 114 do not have to be adjusted to similar heights (i.e., having the same number of effective rungs). Rather, if the ladder is used on an uneven surface (e.g., on stairs), the first rail assembly 102 may be adjusted to one height while the second rail assembly 114 may be adjusted to a different height in order to compensate for the slope of the supporting surface, for use on a set of stairs, or in a variety of other scenarios where the ground or support surface may exhibit a change in elevation between the first and second rails assemblies 102 and 114.

Figure 4:
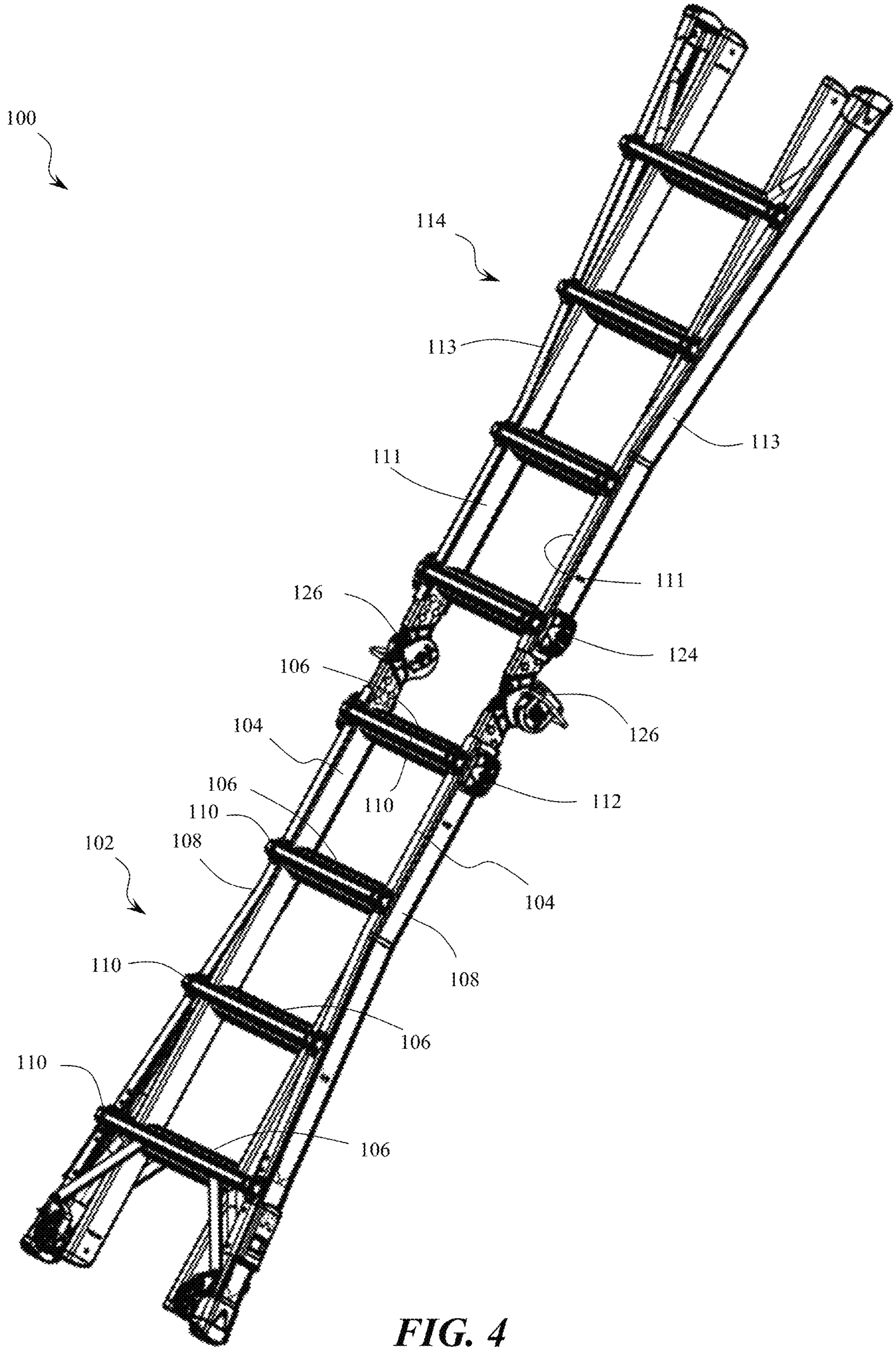
FIG. 4 is a perspective view of the ladder of FIG. 1 in an extended configuration.
Figure 4A:
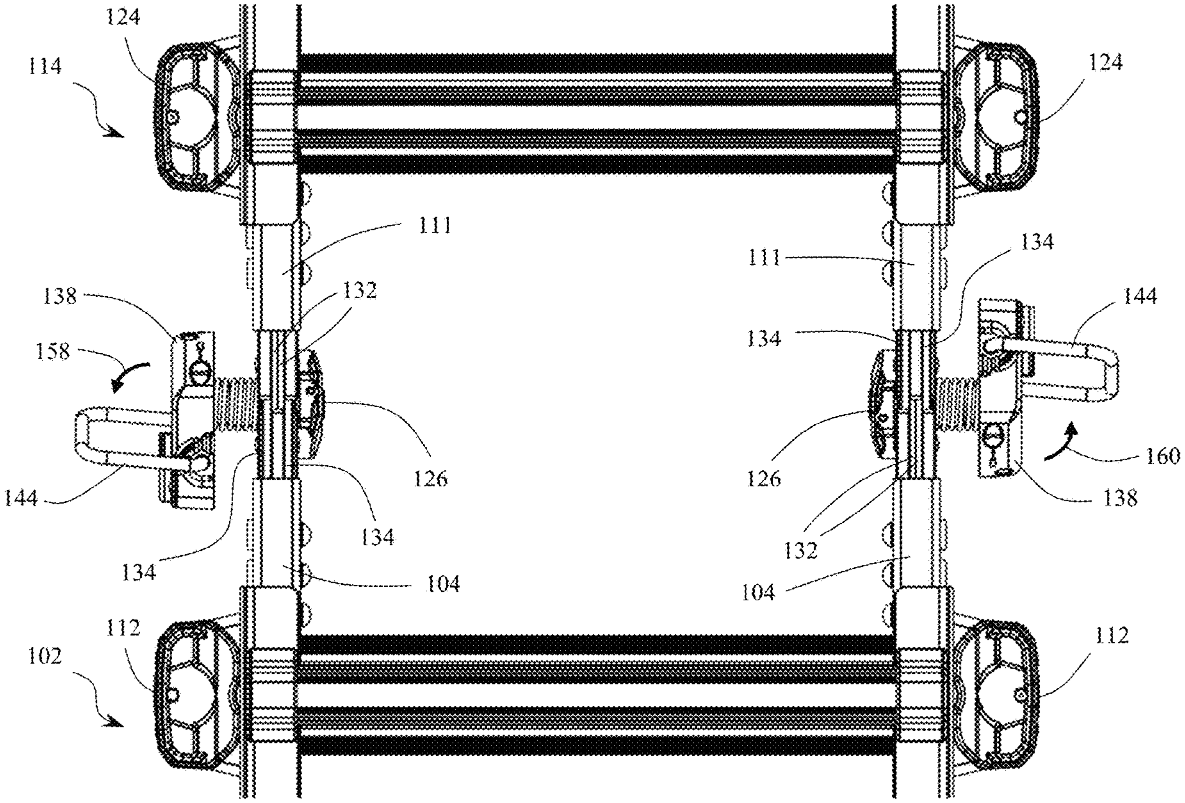
FIG. 4A is a front view of the hinges of the ladder of FIG. 4.

Additionally, the hinge mechanisms 126 provide for additional adjustability of the ladder 100. For example, the hinge mechanisms 126 enable the first and second rail assemblies 102 and 114 to be adjusted to a variety of angles relative to each other. As shown in FIG. 1, the first and second rail assemblies 102 and 114 may be configured at an acute angle relative to each other such that the ladder may be used as a self-supporting or "freestanding" ladder, similar to a step ladder. However, the first and second rail assemblies 102 and 114 may be rotated or pivoted about the hinge mechanisms 126 so that they extend from one another in substantially the same plane (i.e., exhibiting an angle of substantially 180° with respect to each other) with the hinge mechanisms 126 locking them in such an orientation, as shown in FIGS. 4 and 4A. When configured in this manner, the ladder 100 may be used as an extension ladder or "straight ladder." Moreover, each of the first and second assemblies 102 and 114 are still adjustable with respect to their lengths (i.e., through the relative longitudinal displacement of their respective inner and outer assemblies). It is additionally noted that the rungs of the various assemblies (e.g., rungs 106, 110) are configured to have support surfaces on both the tops and the bottoms thereof so as to enable their use in either a step ladder configuration or an extension ladder configuration.

Figure 2:
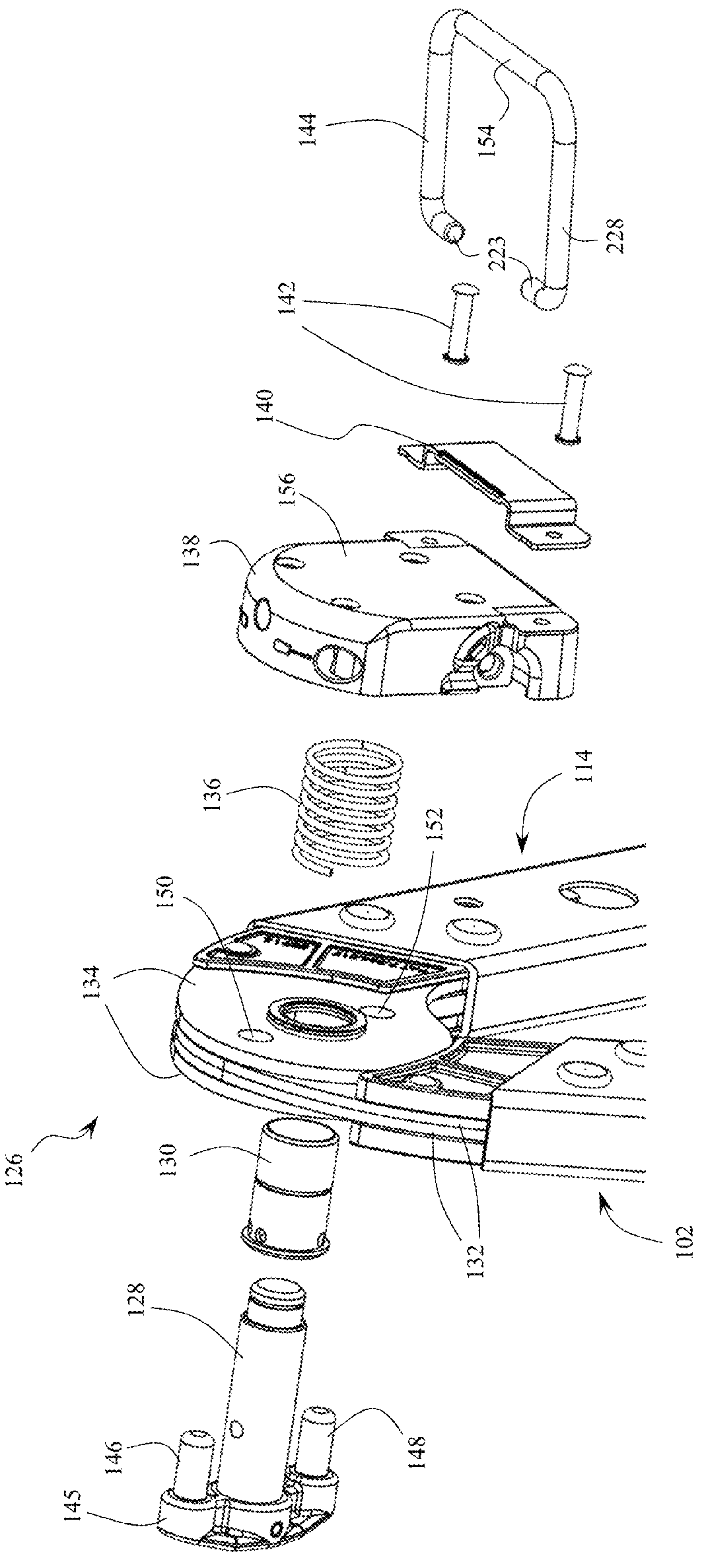
FIG. 2 is an exploded view of a hinge mechanism of the ladder of FIG. 1.

FIG. 2 shows an exploded perspective view of a hinge mechanism 126 including a pivot pin 128, a sleeve 130 or bushing, a set of slidable/rotatable rail plates 132, 134 (which are, respectively, parts of the first and second rail assemblies 102, 114), a biasing member 136 or spring, a button body 138, a button plate 140, button fasteners 142, and a support arm 144. The pivot pin 128 is attachable to the button body 138 while extending through the rail plates 132, 134, the sleeve 130, and the biasing member 136. The sleeve 130 can comprise a hardened barrel that holds together and aligns the rail plates 132, 134. In some embodiments, the sleeve 130 can act as a pivot for the hinge assemblies and can allow the hinge to be retained in an unlocked position (via a detent mechanism). For example, the pivot pin 128 can be inserted into an inward-opening aperture or recess in the button body 138 and can be secured in place by a fastener or clip to the button body 138. As also described in connection with U.S. Pat. No. 4,407,045, the pivot pin 128 can be integrally formed with (or coupled to, via a bracket 145) a pair of locking pins 146, 148 that are selectively insertable and (at least partially, if not entirely) withdrawable from a corresponding pair of locking apertures 150, 152 extending through each of the rail plates 132, 134. The locking apertures 150, 152 can align with each other to form a continuous passage through the rail plates 132, 134 when the rail plates 132, 134 are in a set of predetermined orientations relative to each other (e.g., in the freestanding or extension ladder positions).

Figure 3A:
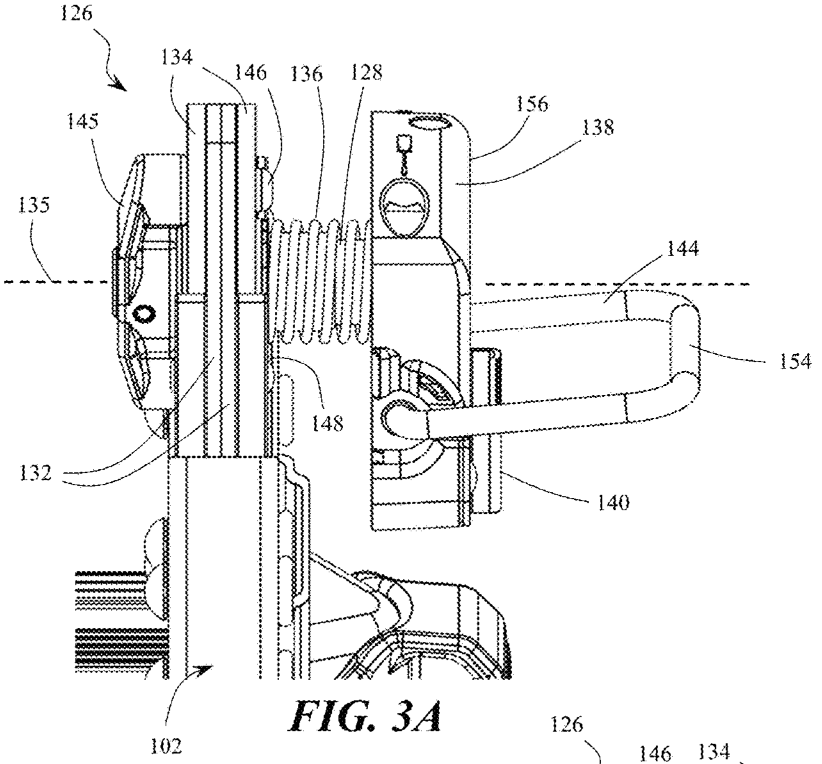
FIG. 3A is a front view of the hinge mechanism of FIG. 2 in a locked condition.
Figure 3B:
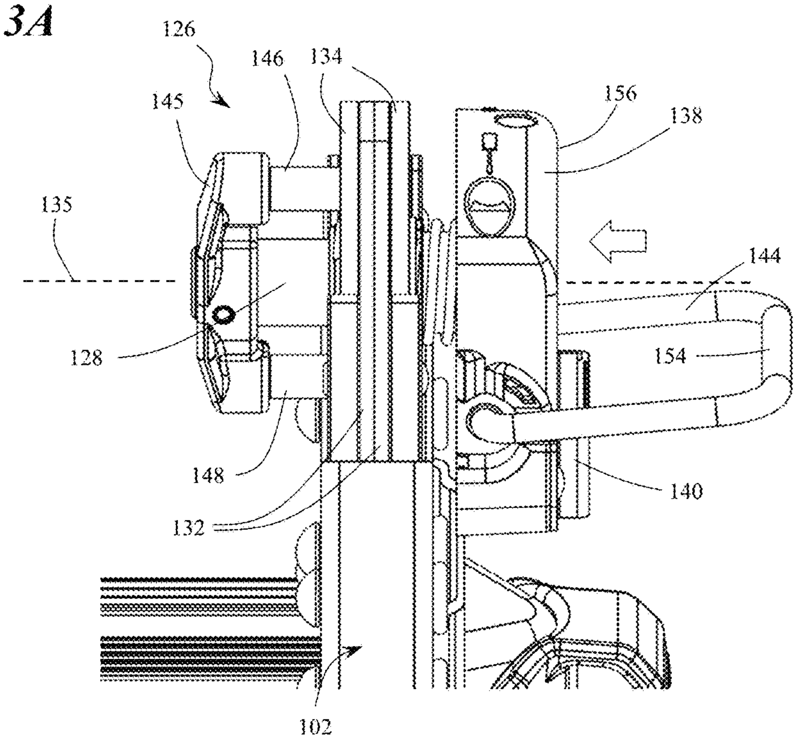
FIG. 3B is a front view of the hinge mechanism of FIG. 3A in an unlocked condition.

Thus, as shown in the front plan view of FIG. 3A, the hinge mechanism 126 can have a locked position (e.g., a first axial position on an axis of rotation, e.g., axis 135) in which the locking pins (e.g., 146, 148) extend through the locking apertures (e.g., 150, 152) and thereby prevent the rail plates 134 associated with the first assembly 102 from rotating relative to the rail plates 132 associated with the second assembly 114. As shown in FIG. 3B, the hinge mechanism 126 can be laterally/axially transitioned to an unlocked position (e.g., a second axial position on the axis of rotation, e.g., 135) in which the locking pins 146, 148 are removed from the locking apertures 150, 152 (or at least from the locking apertures in the central rail plates 132 and the laterally outermost rail plate 134, e.g., similar to the pins in U.S. Pat. No. 4,407,045), thereby allowing rotation of the first rail plates 132 relative to the second rail plates 134 about an axis of rotation 135 (i.e., a pivot axis or hinge axis) extending centrally through the shaft of the pivot pin 128.

For example, when unlocked, the first assembly 102 can rotate relative to the second assembly 114 from the stepladder configuration of FIG. 1 into the extension configuration of FIG. 4 or into a storage configuration (i.e., a collapsed configuration) in which the rails of the first and second assemblies 102, 114 are parallel to each other and next to each other. A laterally inward-directed force can be applied to an axially-facing surface 156 (see FIG. 2) of the button body 138 to move the pivot pin 128 and locking pins 146, 148 laterally inward by overcoming a biasing force applied to the button body 138 by compressing the biasing member 136. When in the unlocked condition, the biasing member 136 can apply an laterally outward biasing force to the button body 138 that, via the pivot pin 128, biases the locking pins 146, 148 laterally outward and into the locking apertures 150, 152 when the apertures of both sets of plates 132, 134 align (i.e., when the ladder 100 is in the standing configuration of FIG. 1 or in the extension configuration of FIG. 4). As used herein, a "lateral" direction refers to a direction parallel to axis 135, "laterally inward" refers to a lateral direction oriented toward the center of the ladder (i.e., the vertical centerline between the rails 104), and "laterally outward" refers to a lateral direction oriented away from the center of the ladder.

While the ladder 100 is in the freestanding configuration of FIG. 1, the button body 138 on each hinge mechanism 126 can be oriented relative to a ground plane (i.e., a horizontal support surface positioned under and supporting the first and second assemblies 102, 114) so that the support arm 144 on each side has a horizontally-extending width portion 154 when deployed (i.e., in the condition shown in FIG. 1). In other words, the tops of the buttons 138 can both face the same direction (e.g., vertically upward) when in the standing configuration, and the support arms 144 can both deploy downward (e.g., vertically downward) and laterally outward in a mirrored fashion with the width portions 154 of the arm(s) 144 parallel to the ground/ladder support surface under the feet of the ladder 100. As further explained below, the support arms 144 can therefore be configured to support tools or other objects for the user for easy access while the user has climbed the standing ladder. In some embodiments, the support arms 144 can be configured to remain in permanent positions relative to their respective button bodies 138, such as by being integral parts of the button body structures 138 or by being adhered, fastened, or otherwise permanently attached in the deployed position.

Figure 14:
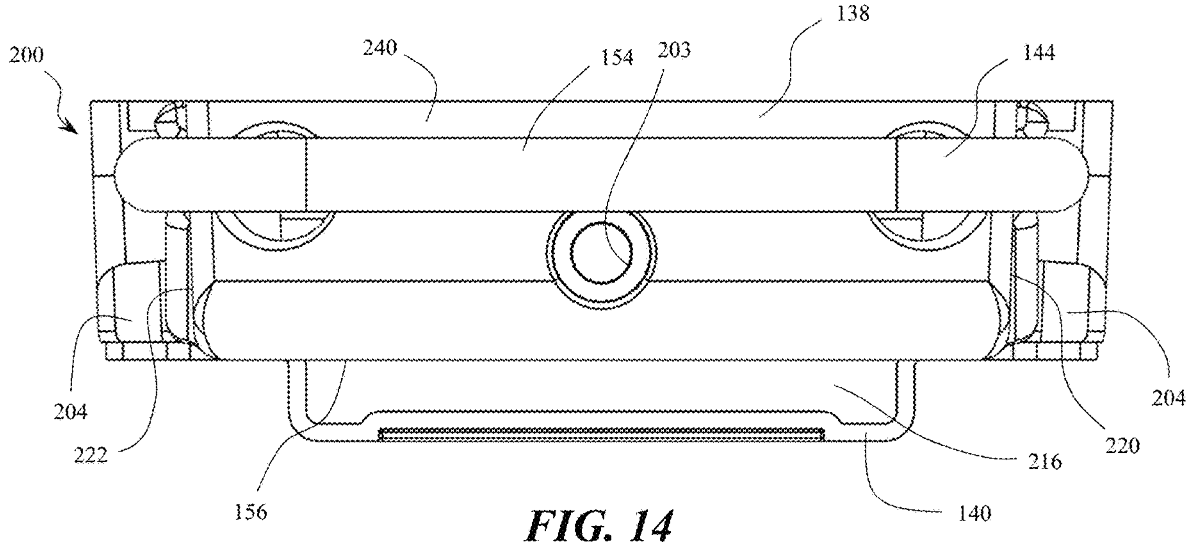
FIG. 14 is a top view of the button of FIG. 5.
Figure 15:
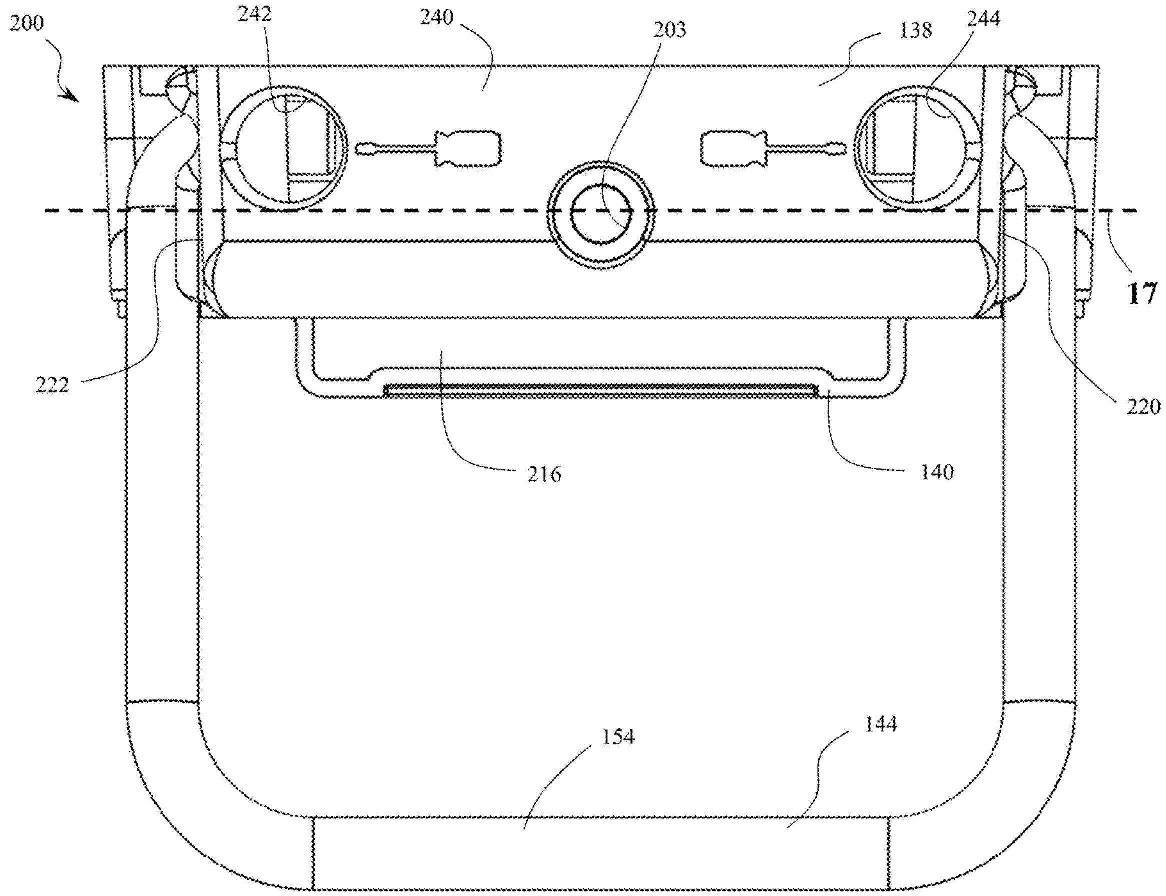
FIG. 15 is a top view of the button of FIG. 6.

The support arms 144 can include a C- or U-shaped profile configured with ends 223 that fit into openings 214 in the button body 138. See FIGS. 2, 5-8, and 11-16. In some embodiments, a support arm 144 can have straight portions (e.g., width portion 154 and/or side bars 228) that extend between curved corner portions (e.g., as shown in the figures) or pointed corner portions. The size of a support arm 144 can be sufficient that the three sides of the support arm 144 (e.g., 154 and 228) allow the support arm 144 to rotate to the storage or collapsed configuration (FIG. 5) with the horizontal width portion 154 positioned above the top surface of the button body 138. In other words, the entire thickness of the support arm 144 can lie between two parallel planes that are defined by the outward and inward axially-facing surfaces (i.e., 156 and 1600) of the body 138. The support arm 144 can have straight sides to maximize the size of the opening defined by the support arm 144 and body 138 (and/or plate 140) when the arm 144 is in the deployed configuration (FIG. 15). A large opening can enable a variety of tools or other objects to be supported by the button 200, including, for example, a chuck of a power drill or a large handle. Furthermore, straight sides of the arm 144 can allow a user to hang clips or hooks on the arm 144 that would not be able to hang on a curved rod, such as a tool's belt clip or clamps that are configured to be retained to a substantially flat (or flattenable) support member/belt. Additionally, by having three straight sides, the arm 144 can support such clips or hooks on three different sides of the arm 144 while it is deployed.

In some embodiments, the arm 144 can have a curved profile with zero, one, or two straight portions. A more curved profile can minimize the size of the button 200 while the arm 144 is in the collapsed configuration. For example, the arm 144 can have a shape that substantially conforms to the outer perimeter of the side surfaces (e.g., 220, 222, 240) of the body 138 or that is slightly larger than the body 138. Additionally, the arm 144 can have more than three straight portions, such as four or more, if the straight portions are shorter (e.g., width portion 154 is shorter in length) or if the arm 144 extends further from the body 138 when in the collapsed position.

Additionally, the arm 144 is shown with a substantially circular cross-sectional profile (see, e.g., FIGS. 9-10), but its cross-sectional profile can also or alternatively be tubular, square, triangular, combinations thereof, or similar shapes. A curved profile (e.g., circular) can facilitate easier insertion and removal of objects from the arm 144, and a sharper or more angular profile can facilitate more secure retention of items.

The hinge mechanisms 126 can be configured with buttons 138 that rotate in synch with at least the laterally inner hinge plates 134 and their respective pivot pins 128. In one of the hinge mechanisms 126, the laterally inner hinge plate 134 is part of the first assembly 102, and in the other hinge mechanism 126 the laterally inner hinge plate 134 is part of the second assembly 114. This is shown in FIG. 4A, which is a frontal view of the ladder 100 at the hinge mechanisms 126 when in the extension configuration of FIG. 4. Therefore, when the ladder 100 transitions to the extension configuration, one of the buttons 138 can rotate about 180 degrees with the second assembly 114, as shown in FIG. 4A. For this reason, the buttons 138 can, in some configurations, have their orientations different from each other, such as by being flipped about 180 degrees relative to each other when the ladder 100 is in the extension configuration as compared to when the ladder is in the standing configuration. Furthermore, the support arms 144, when deployed, can be parallel to the ground support plane of the ladder 100 when in the freestanding configuration (FIG. 1), but may be at least partially angularly offset from the ground support plane of the ladder 100 when in the extension ladder configuration since the extension ladder can be tilted to various angles relative to the ground support plane. In at least one tilt angle of the extension ladder configuration, which angle corresponds to the angle of the rails relative to the ground support plane when the ladder 100 is in the freestanding configuration, at least one of the support arms 144 can be parallel to the ground support plane. Additionally, in the extension ladder configuration, one of the support arms 144 can transition to being deployed by rotating downward (as indicated by arrow 158) and one of the support arms 144 can transition to being deployed by rotating upward (as indicated by arrow 160).

Figure 5:
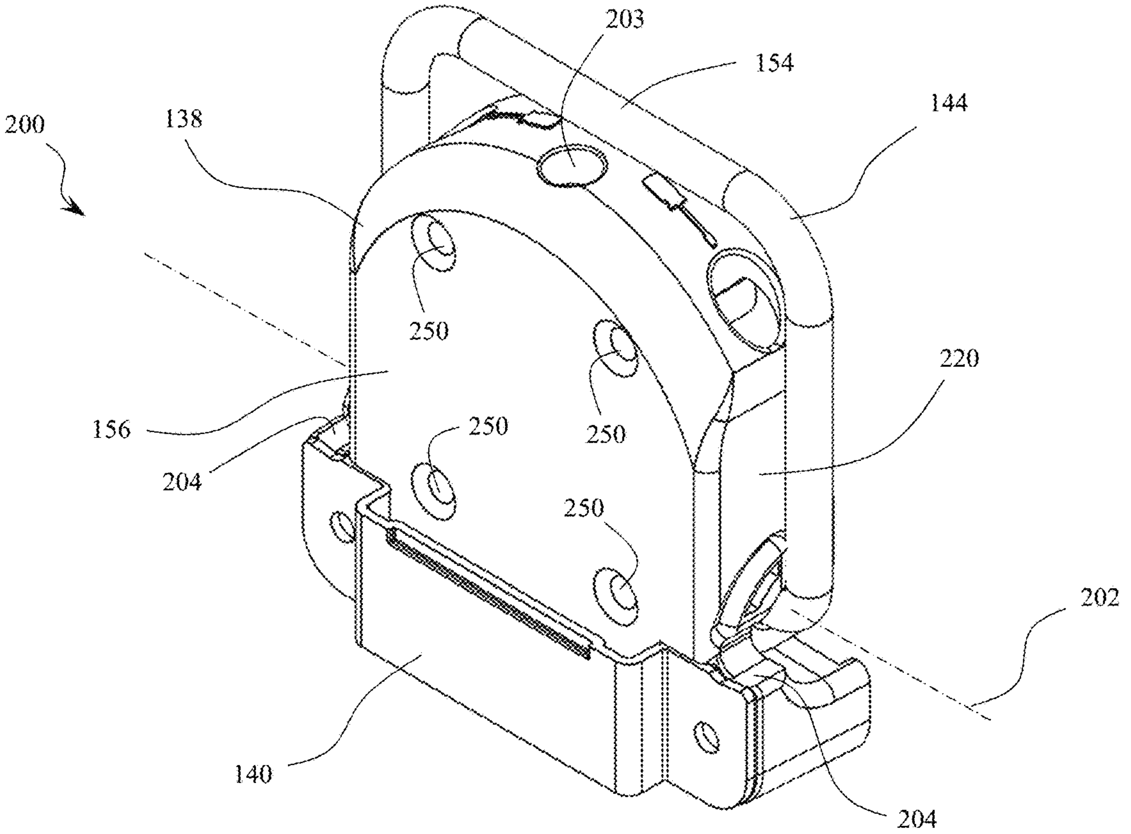
FIG. 5 is a perspective view of a button of the ladder of FIG. 1 with the support arm in a collapsed configuration.
Figure 6:
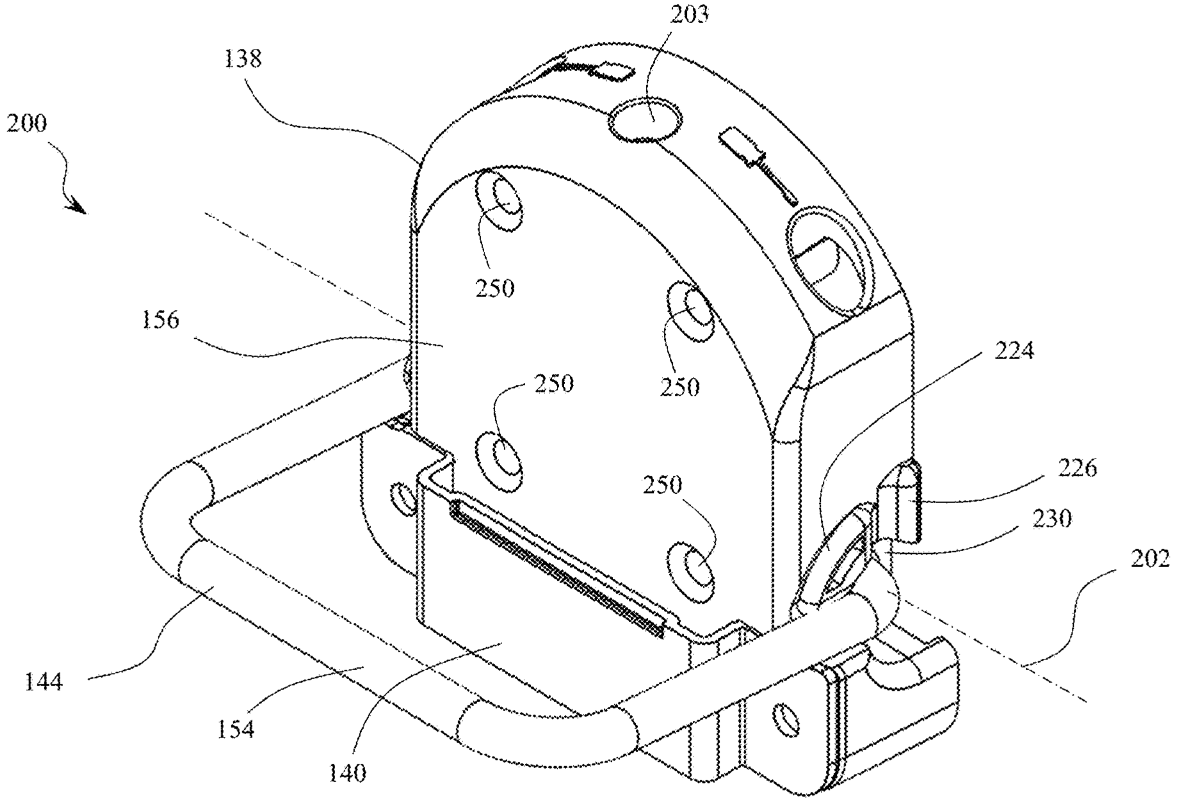
FIG. 6 is a perspective view of the button of FIG. 5 with the support arm in a deployed configuration.
Figure 7:
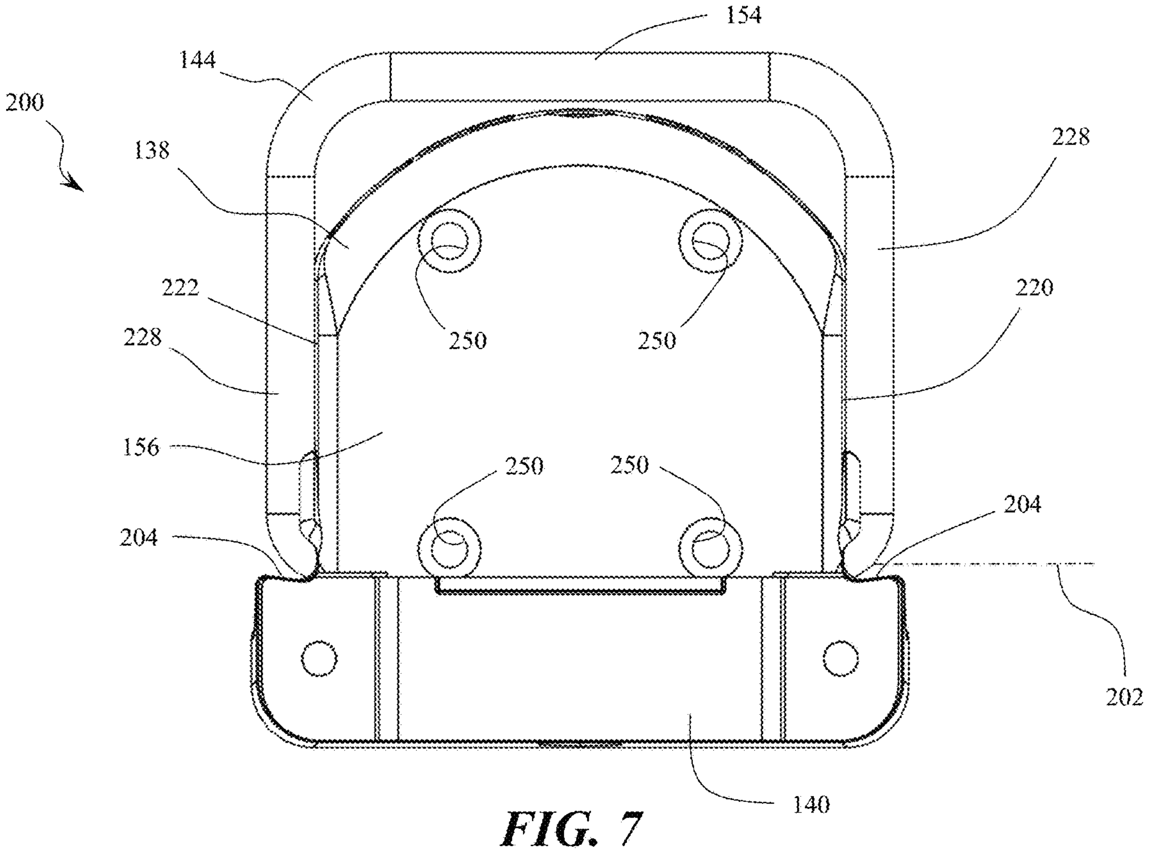
FIG. 7 is a front view of the button of FIG. 5.
Figure 8:
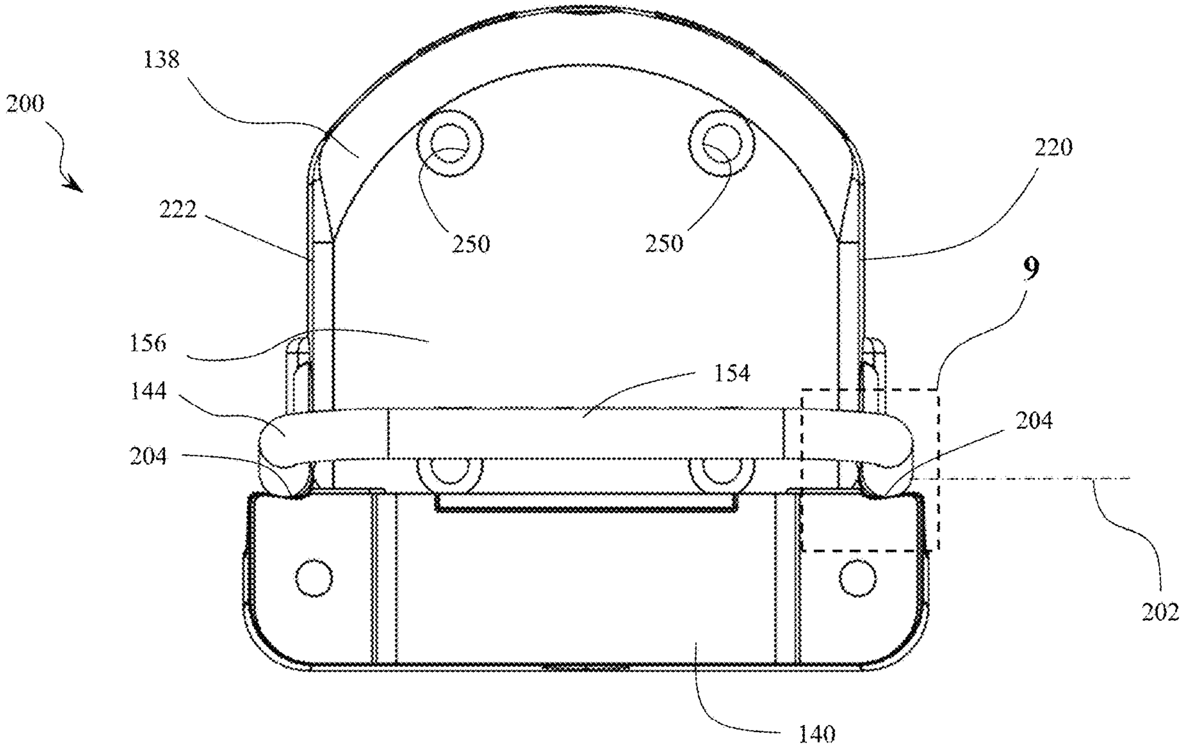
FIG. 8 is a front view of the button of FIG. 6.
Figure 11:
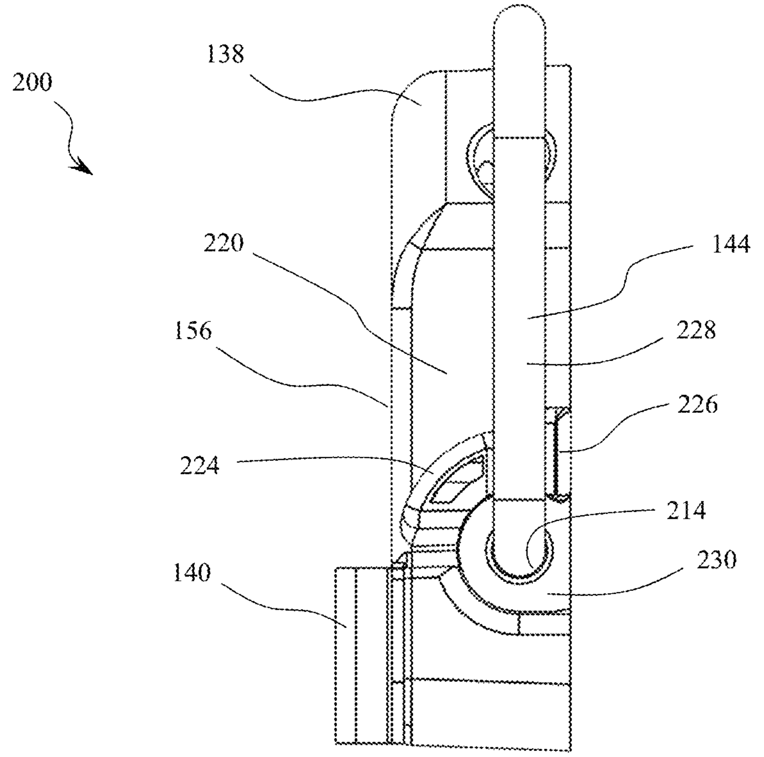
FIG. 11 is a right side view of the button of FIG. 5.
Figure 12:
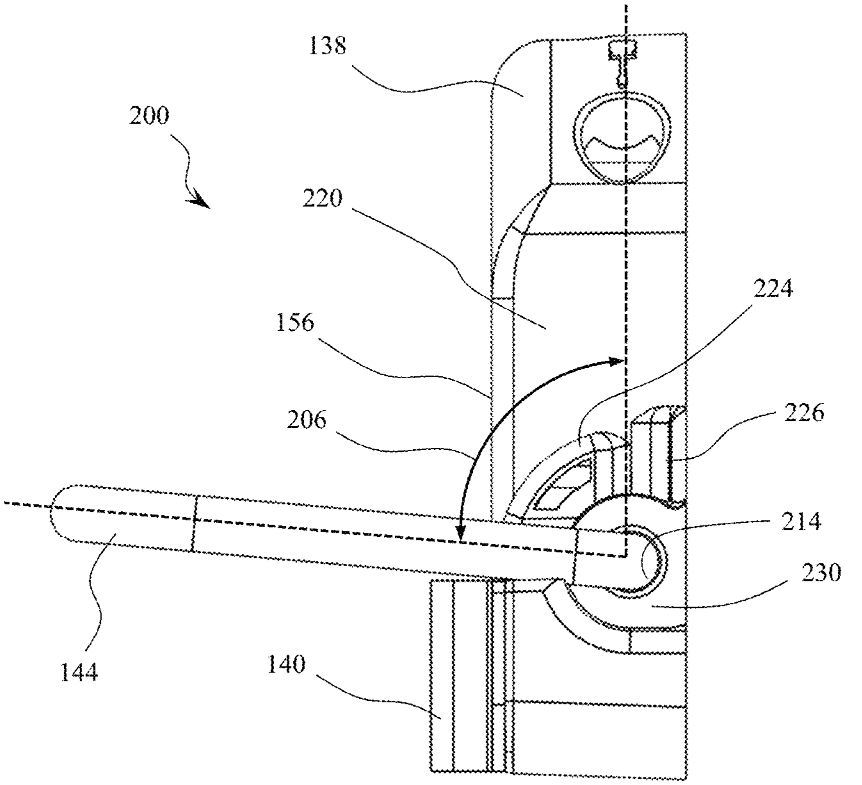
FIG. 12 is a right side view of the button of FIG. 6.
Figure 16:
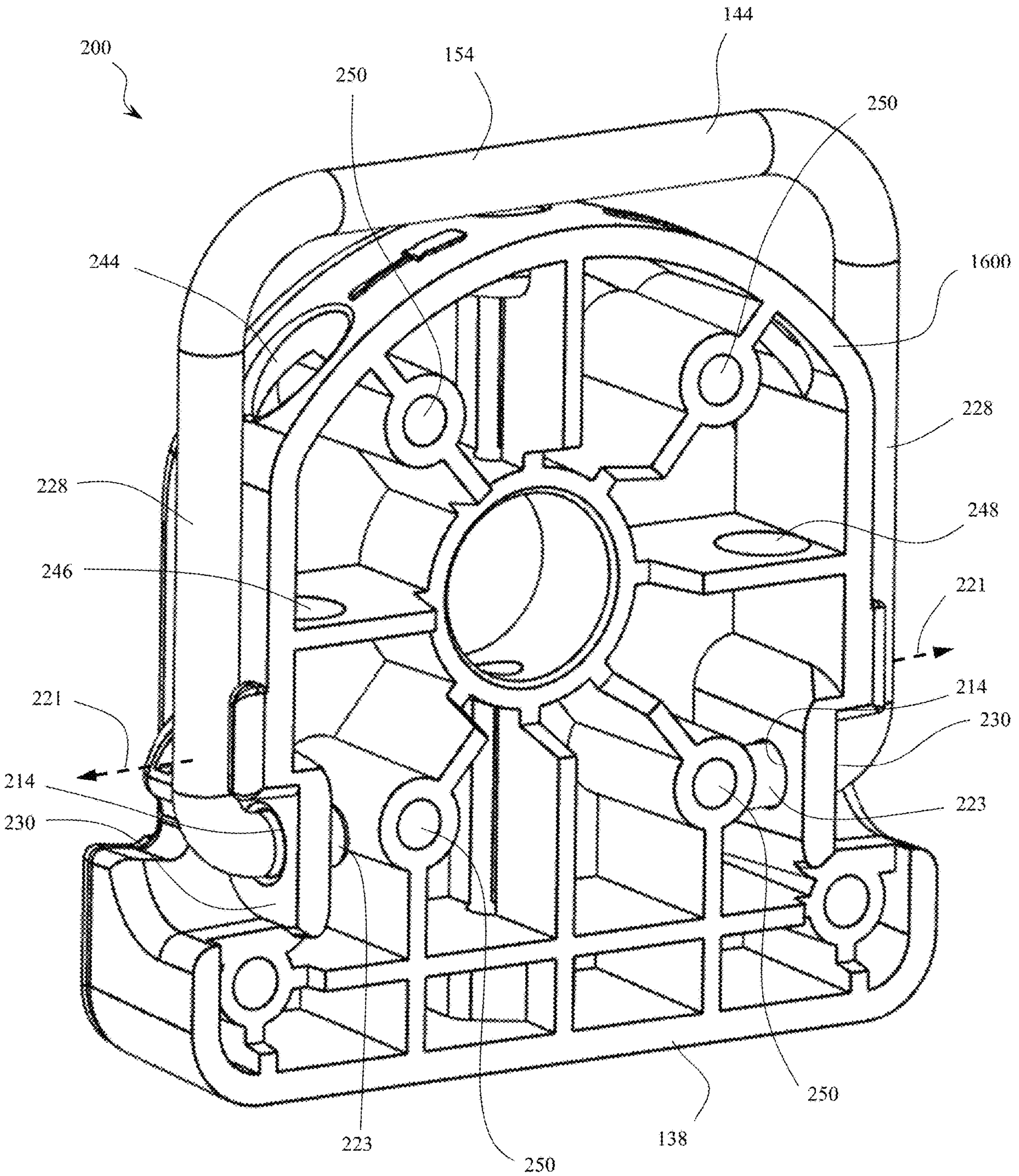
FIG. 16 is a rear perspective view of the button of FIG. 5.
Figure 17:
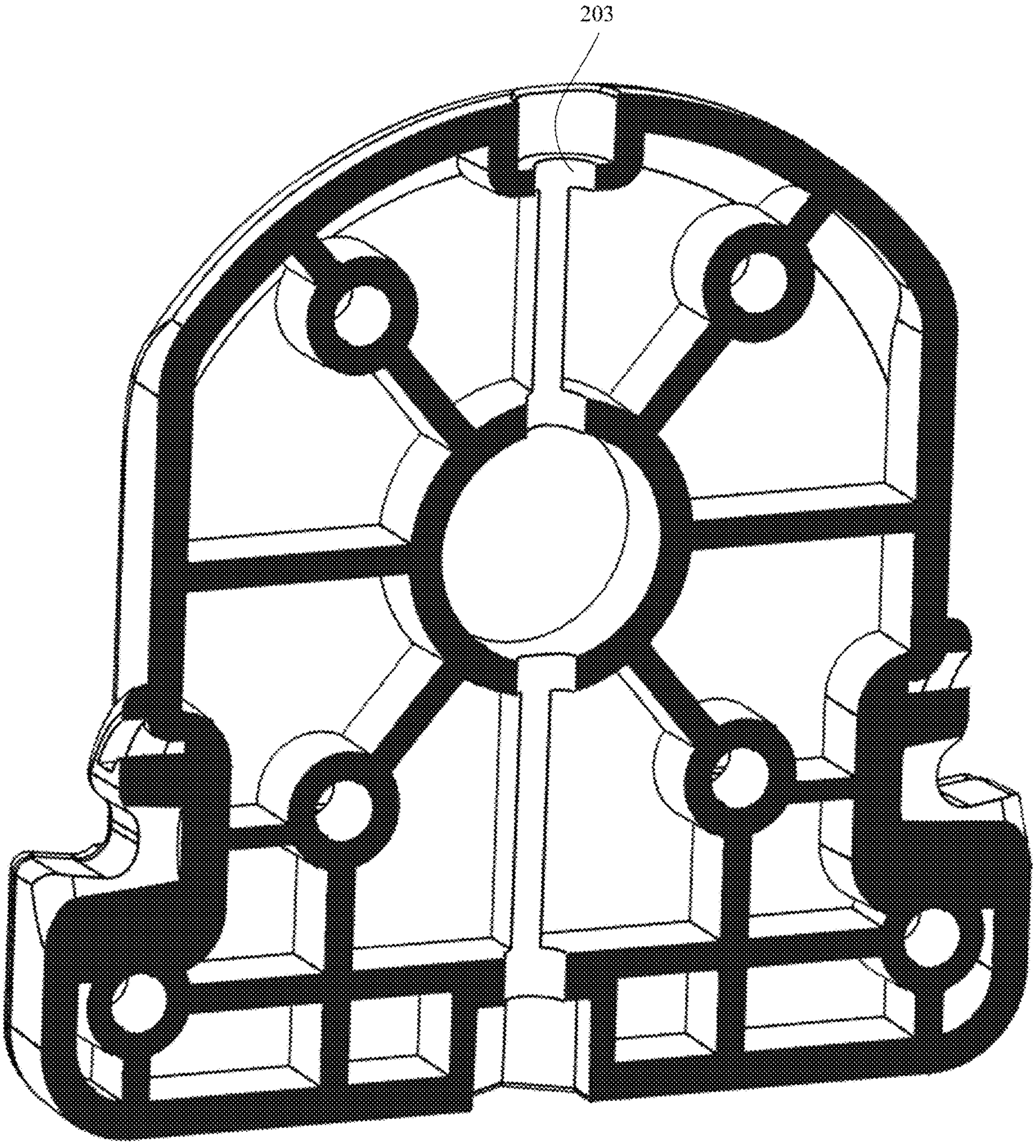
FIG. 17 is a rear perspective section view taken through section plane 17 in FIG. 15.

FIGS. 5 and 6 are perspective views of a button 200 that can be used as part of a locking mechanism (e.g., 126) of a ladder (e.g., 100). In some embodiments, the button 200 can be used as an outer part, handle, or grip of a rail assembly length-locking mechanism 112, 124. The button 200 can include a button body 138 and a support arm 144. The support arm 144 is pivotable relative to the body 138 about a pivot axis 202. In FIG. 5, the support arm 144 is in a collapsed, substantially in-plane flattened position relative to the body 138, and in FIG. 6, the support arm 144 is in a deployed, open, angled position relative to the body 138. While in the deployed position, a user object (e.g., a tool, supplies, hook, cup, etc.) can be supported by the support arm 144, such as by resting, clipping, or hanging a portion of the user object on the support arm 144. The body 138 can be coupled to a pin or shaft extending toward the rest of the locking mechanism 126 of the ladder (e.g., pivot pin 128), so the body 138 can support the support arm 144 while the support arm 144 supports the user object. In some embodiments, a bolt or other fastener can be inserted through the body 138 (e.g., through longitudinal opening 203; see also rear section view of FIG. 17 as taken through section plane 17 in FIG. 15) and through an opening in the pivot pin 128 to couple them to each other. That fastener can be removable, thereby enabling reversible removal of the button body 138 from the pivot pin 128. Thus, the button body 138 and pivot pin 128 can be separable, independent parts that can be reversibly removed from each other or can be coupled and attached to each other by a fastener and corresponding coupling components. FIGS. 7-8 show front side views, FIGS. 11-12 show right side views, and FIGS. 14-15 show top side views the button 200 in the respective collapsed and deployed states. FIG. 16 shows a rear perspective view of the button 200 in a collapsed state.

The body 138 can include a first side surface (e.g., inner axially-facing surface 1600 in FIG. 16) and a second side surface (e.g., outer axially-facing surface 156 in FIG. 5). A user can press on the outer axially-facing surface 156 to compress the biasing member 136 to transition the button 200 from the laterally-outward locked position of FIG. 3A to the laterally-inward unlocked position of FIG. 3B. In some embodiments, the surface 156 can be sized and shaped to comfortably receive pressure from the palm or fingers of the user's hand. Thus, the button body 138 can be referred to as a button, switch, compression surface, or compression button of the locking mechanism 126.

The body 138 can include a pair of support surfaces 204 (or one support surface 204 on each opposing side of the body 138 between the first and second side surfaces 1600, 156) on which the support arm 144 can rest and engage when in the deployed position of FIG. 6, as shown in FIG. 8. The support surfaces 204 can therefore be oriented facing upward or substantially upward. The support surface 204 can provide resistance to downward angular rotation of the support arm 144 past a predetermined deployed angle 206, as shown in FIG. 12. The deployed angle 206 can be defined relative to a vertical direction or an axis lying in the plane defined by the outer axially-facing surface 156. In some embodiments, the deployed angle 206 can be about or exactly 90 degrees, such as being in a range of about 88 degrees to 91 degrees, wherein the side bars 228 of the support arm 144 are about or exactly horizontal and parallel to the horizontal ground support surface of the ladder 100 when deployed.

In some embodiments, the deployed angle 206 can be less than 90 degrees, such as being between about 75-85 degrees relative to the vertical direction. This configuration can beneficially allow the support arm 144 to slightly bend downward (e.g., when loaded with an object) without bending past 90 degrees, thereby eliminating or at least limiting the possibility that the support arm 144 will rotate downward and allow the object to fall out of the support arm 144. Additionally, if the ladder 100 laterally tips over and falls to the ground with the button 200 having a deployed support arm 144, with a deployed angle 206 under 90 degrees, the arm 144 will, under the weight of the rest of the ladder 100, rotate back toward the collapsed or storage position (FIG. 11). With the arm 144 at 90 degrees, the arm 144 itself and the openings 214 supporting the arm 144 would bear more of the impact forces and more likely cause damage to the arm 144 or body 138.

Figure 9:
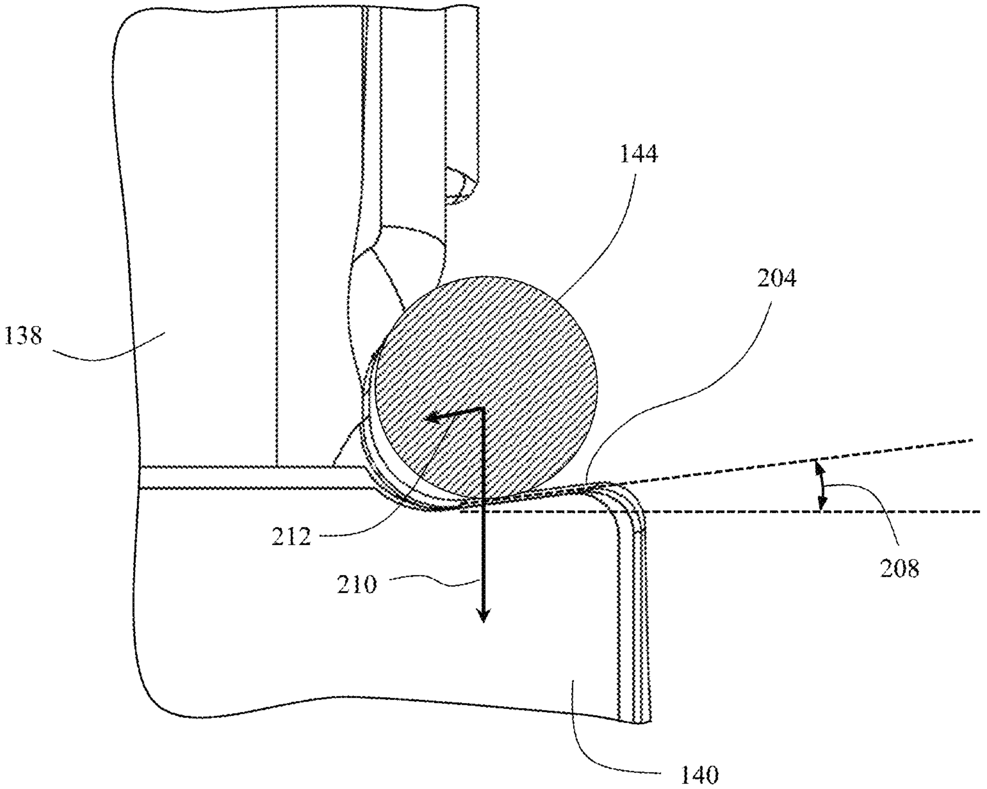
FIG. 9 is a front section view of the button of FIG. 8, as indicated by box 9 in FIG. 8.
Figure 10:
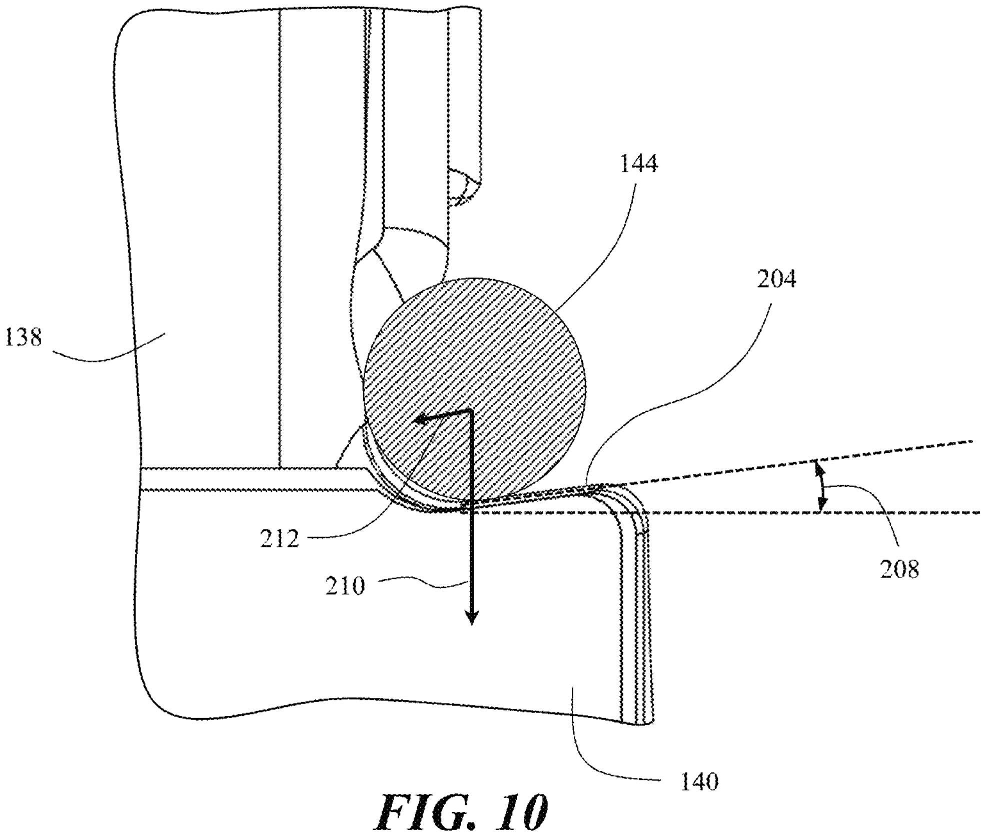
FIG. 10 is a front section view of the button of FIG. 9 with the support arm loaded.

In some embodiments, the support surfaces 204 can define inward-sloping ramped angles, as shown by angle 208 shown in FIG. 9 (which is a detail view of the button 200 as taken at box 9 in FIG. 8 and in which the support arm 144 is shown in section view where it contacts surface 204) and visible in FIGS. 7 and 8. When the support arm 144 is deployed, it can rest on the support surfaces 204, and the weight of objects supported by the arm 144 can pull downward on the arm 144 to rotate it toward the deployed position. The downward force (e.g., 210 in FIG. 9) can, when applied to the support surface 204, drive the arm 144 along an inward direction (i.e., along direction 212; down the slope and toward the centerline of the body 138 between the support surfaces 204), as shown in FIG. 10, which shows the arm 144 displaced inward relative to the unloaded condition shown in FIG. 9. This movement can reduce or eliminate the possibility that the arm 144 will flex laterally outward at the support surfaces 204 when weighted down and then potentially rotate past the deployed angle 206 or become detached from the body 138 (e.g., by being pulled from at least one side opening 214 shown in FIG. 11). Thus, any flexure of the support arm 144 can be biased inward by the ramped angle of the support surfaces 204, thereby tightening the grip and attachment between the support arm 144 and the body 138 rather than potentially loosening that grip.

In some embodiments, the button plate 140 can be included on the laterally outward side 156 of the button body 138. A portion of the button plate 140 (e.g., a middle or central portion) can be spaced away from the axially-facing surface 156, as clearly shown in FIGS. 14-15. A gap 216 between the button plate 140 and the button body 138 can receive and retain a thin item such as a spatula, paper, or an end hook portion of a tape measure. Thus, in some embodiments, a hinge mechanism 126 having a button body 138 and a button plate 140 can be referred to as a "retainer" herein, and pairs of such structures (i.e., hinge mechanisms 126) can be referred to as pairs of retainers.

The ends of the button plate 140 can be attached to the body 138 and can have a top surface or top edge 218 (see FIG. 13) configured to engage the support arm 144 when the arm is in the deployed position. In some embodiments, the button plate 140 can comprise a more rigid material than the button body 138, so the top edge 218 can help limit the amount of downward flexure possible for the support surface 204 and arm 144 when the arm 144 is loaded by a user item. In some embodiments, the button plate 140 can be at least partially comolded or formed as an integral part of the body 138. Thus, the button plate 140 and body 138 can be formed of different materials having different weights, strengths, and flexibilities, such as with the button plate 140 comprising metal (e.g., steel, aluminum, magnesium, similar metals, alloys, or combinations thereof) and the body comprising plastic (e.g., polyurethane, acrylonitrile butadiene styrene (ABS), polyvinyl chloride (PVC), similar plastics, or combinations thereof).

Side surfaces 220, 222 of the body 138 can have the side openings 214 formed therein to receive ends of the support arm 144. One or both of the side surfaces 220, 222 can also include a set of protrusions 224, 226 configured to face away from the center of the body 138 and to engage the support arm 144. A vertical protrusion 226 on each side can limit angular rotation of the support arm 144 about the arm pivot axis 202 in a laterally inward direction past a predefined, in-plane storage position (e.g., as shown in FIG. 11). Thus, the normal operating range of motion of the support arm 144 can be defined by contact with the support surface 204 on one end (e.g., FIG. 12) and by contact with the vertical protrusion 226 on the opposite end (e.g., FIG. 11). In some embodiments, the support arm 144 can comprise a flexible material, shape, and size that permits it to expand, at least temporarily, and to flex to have its ends 223 (see FIG. 16) withdrawn from the side openings 214 and to have its side bars (e.g., 228 in FIG. 11) clear the vertical protrusion 226 for removal of the support arm 144 from the body 138. This direction of flexure is indicated, for example, by arrows 221 in FIG. 16. Similarly, the support arm 144 can be constructed in a manner capable of flexing to pass the vertical protrusion 226 when being installed to the body 138. The side openings 214 can be formed in recesses (e.g., 230 in FIG. 13) relative to the side surfaces 220 so that the ends 223 of the support arm 144 do not have to expand outward so far as to potentially cause plastic deformation or breakage of the support arm 144 while being installed to (or removed from) the body 138.

Figure 13:
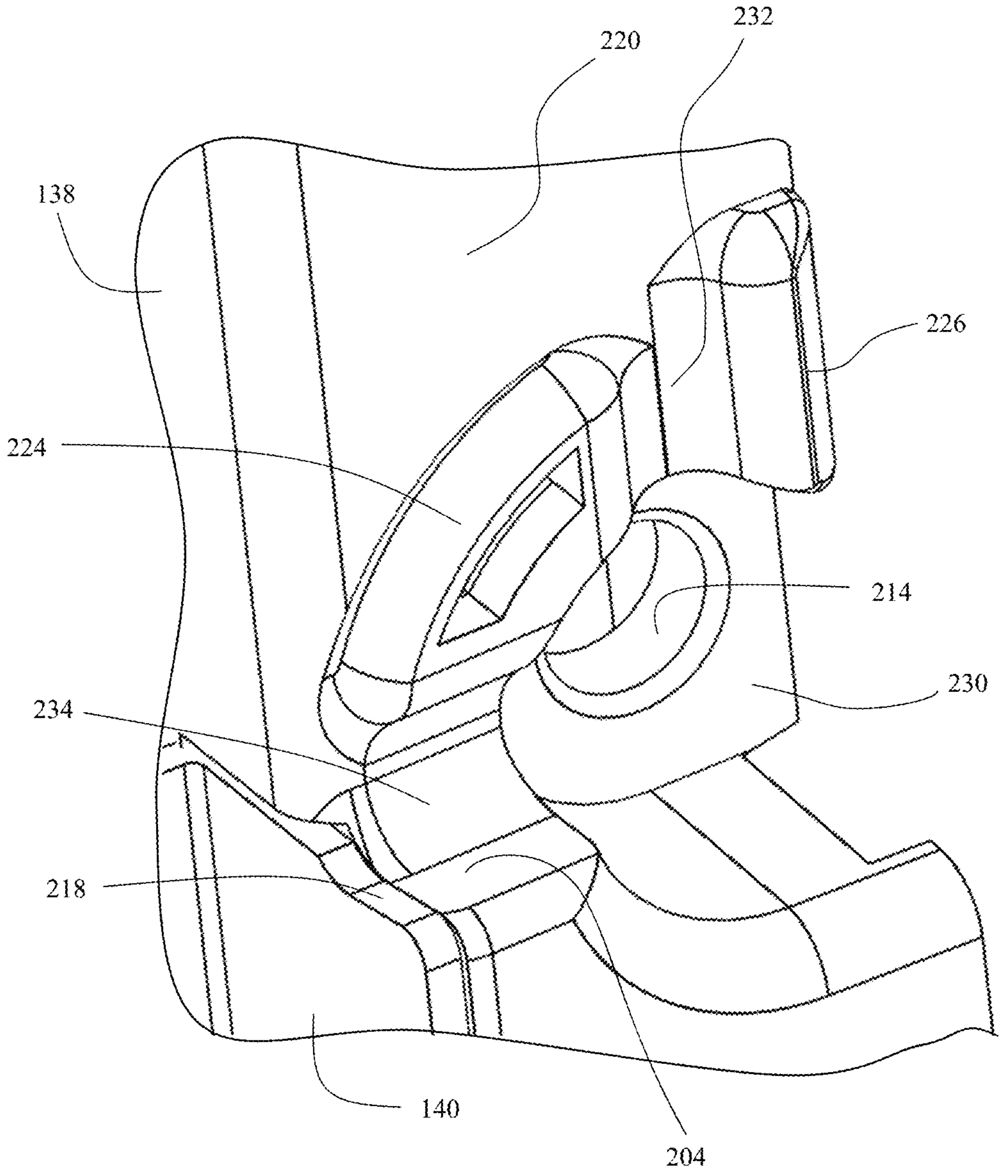
FIG. 13 is a detail perspective view of a portion of the button body of the button of FIG. 5.

Central protrusions 224 of the side surfaces 220, 222 can provide ramped surfaces that bias the side bars 228 of the support arm 144 into the storage position (FIG. 11) on one end and into the deployed position (FIG. 12) on the opposite end if the central protrusion 224. Thus, the central protrusions 224, vertical protrusions 226, and support surfaces 204 can form a pair of grooves in a side surface (e.g., 220), with one groove corresponding to the storage position and one groove corresponding to the deployed position. FIG. 13 shows the protrusions 224, 226 and support surface 204 with example collapsed-arm groove 232 and deployed-arm groove 234 indicated. The support arm 144 can comprise an elastically deformable material (e.g., spring steel) configured to flex outward and away from the side surfaces 220, 222 to move from a low-potential-energy position in a groove (e.g., 232) to a higher-potential energy position (e.g., engaging the protruding part of protrusion 224 between the grooves 232, 234) and then to be elastically biased back into a lower-potential energy position when reaching another groove (e.g., 234) as the arm 144 rotates about axis 202. Thus, the support arm 144 can be biased into the grooves 232, 234, and can resist rotation away from a groove 232/234 due to friction with the central protrusion 224, but can be rotated away from a groove 232/234 upon application of sufficient torque to overcome that friction and to expand the side bars 228 away from the side surfaces 220, 222.

In some embodiments, the vertical protrusion 226 can protrude further from the side surface 220 than the central protrusion 224. See FIGS. 8-10 and 14-15. Thus, the expansion of the support arm 144 needed to rotate over the central protrusion 224 is less than the expansion of the support arm 144 needed to rotate past the vertical protrusion 226. This can help limit over-rotation of the support arm 144 whereby the arm 144 would move out of the range of motion discussed above.

The top views of FIGS. 14 and 15, among others, show that the button body 138 can include a top surface 240. The top surface 240 can be configured to face, on average, vertically upward when the ladder 100 is in the freestanding configuration and on a level ground support surface. The button body 138 can include a set of item retention apertures 242, 244 (or recesses) extending through (or receding into)

the top surface 240. Retention apertures 242, 244 can be generally circular in cross-section and can provide openings into which an elongated item can be inserted through the top surface 240, such as a screwdriver, awl, fastener (e.g., nail or screw), fork, brush, or similar structure. Furthermore, in some embodiments, an accessory can be attached to the body 138 using the retention apertures 242, 244 such as, for example, a shelf or cup holder having hooks or other elongated rods insertable into the retention apertures 242, 244 so that the accessory is at least temporarily supportable by the button body 138. Additionally, an accessory (e.g., shelf, cup holder, tool organizer, etc.) can be attachable to the outer axially-facing surface 156 through at least one axially-oriented opening 250 (e.g., using fasteners into the opening(s) 150). See FIGS. 5-8 and 16.

In some embodiments, at least one retention aperture (e.g., 242 or 244) can vertically align with an internal aperture (e.g., 246 or 248) extending through a web or other structural feature within the button body 138, as shown in FIG. 16. Thus, an elongated item can extend through and be positioned within both the retention aperture and the internal aperture for increased support and stability of the item while it is being held in place.

FIGS. 18-22 show an embodiment of a button 300 having features in common with button 200 described above and which are referenced using similar identifying numerals. Button 300 includes a support arm 344 with partially curved and angled portions connected to each other by a straight width portion 354. Thus, the support arms 344 can include a C- or U-shaped profile configured with ends that fit into side openings in the button body 338 in the manner described above in connection with openings 214. In some embodiments, the support arm 344 has straight side bar portions 328 that are configured to slide against and engage the side protrusions 324 of the button body 338 and that fit within the storage groove and deployed groove on the ends of the side protrusions 324.

Figure 19:
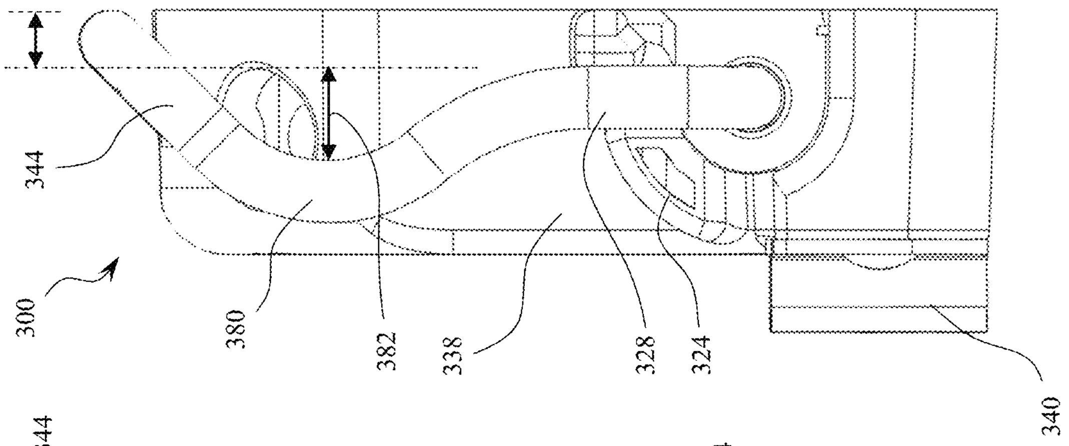
FIG. 19 is a right side view of the button of FIG. 18.
Figure 18:
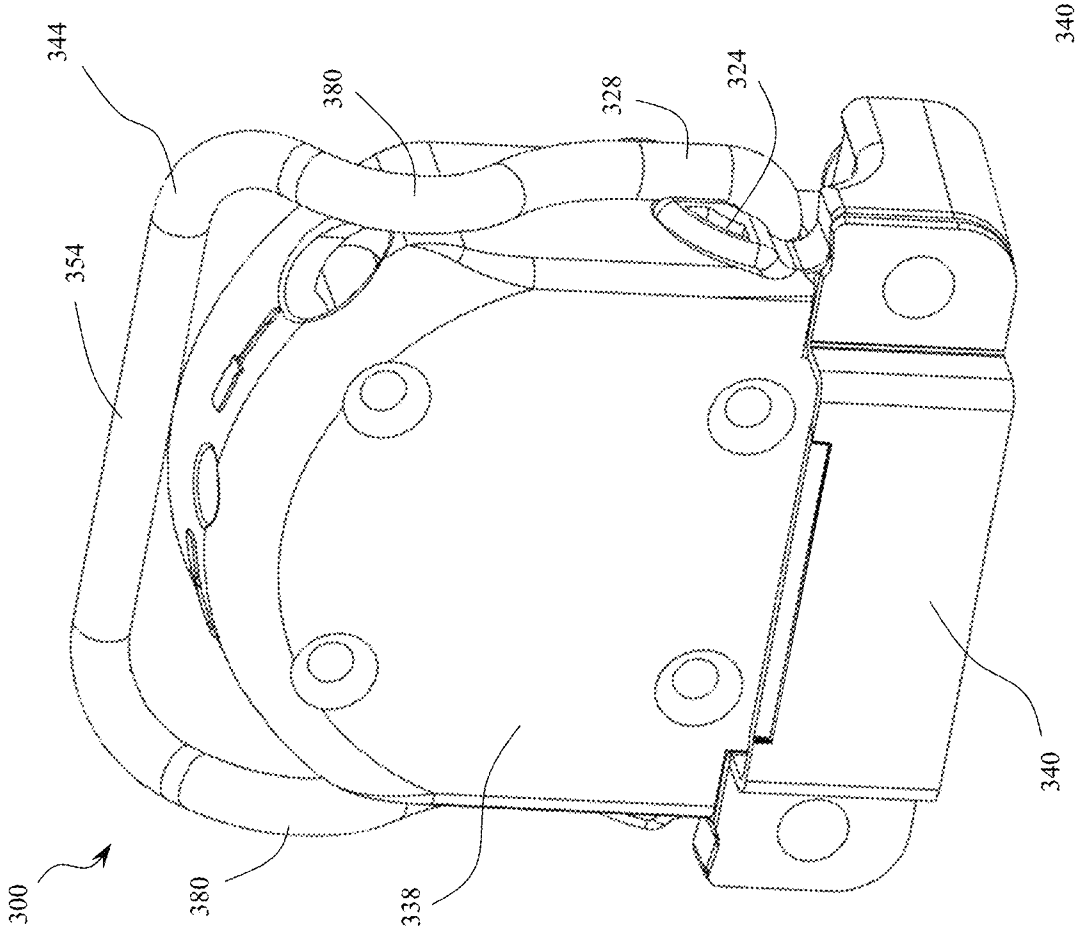
FIG. 18 is a perspective view of another button for a ladder with a support arm in a storage position.
Figure 21:
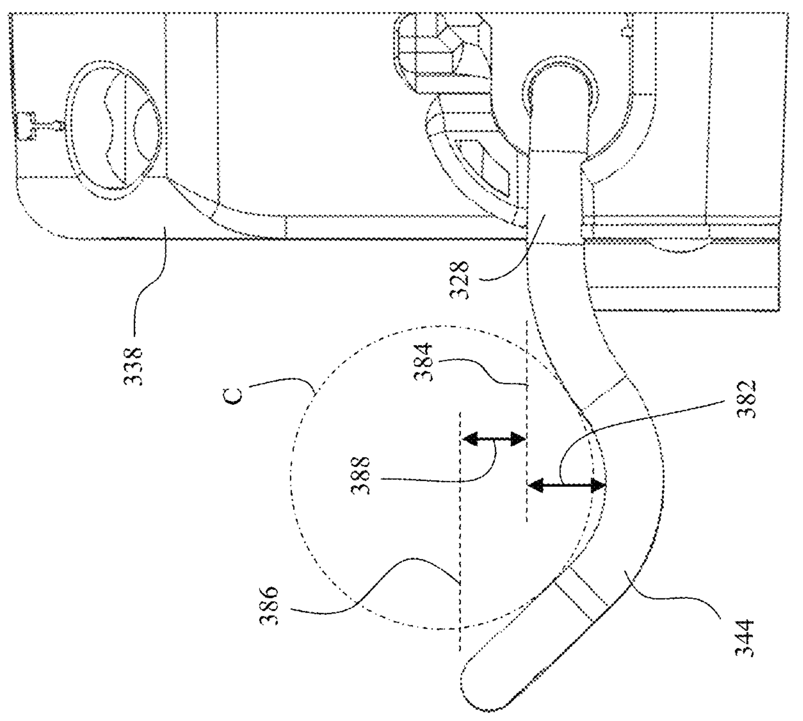
FIG. 21 is a right side view of the button of FIG. 20.
Figure 20:
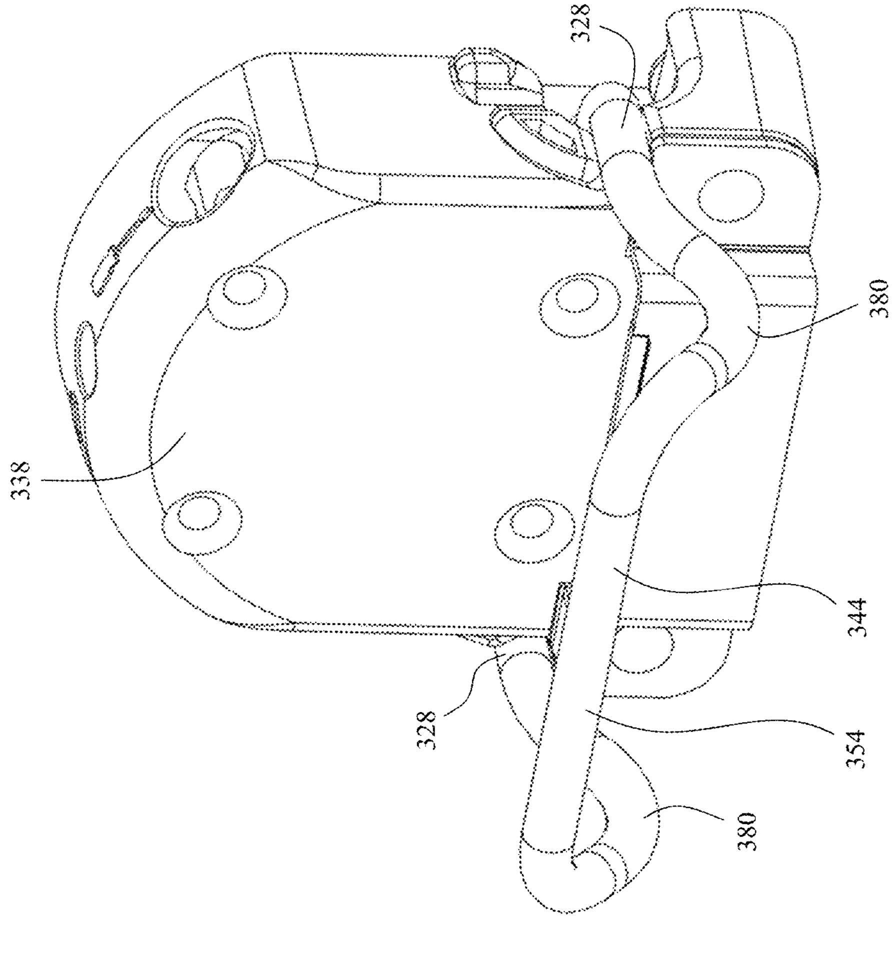
FIG. 20 is a perspective view of the button of FIG. 18 with the support arm in a deployed position.
Figure 22:
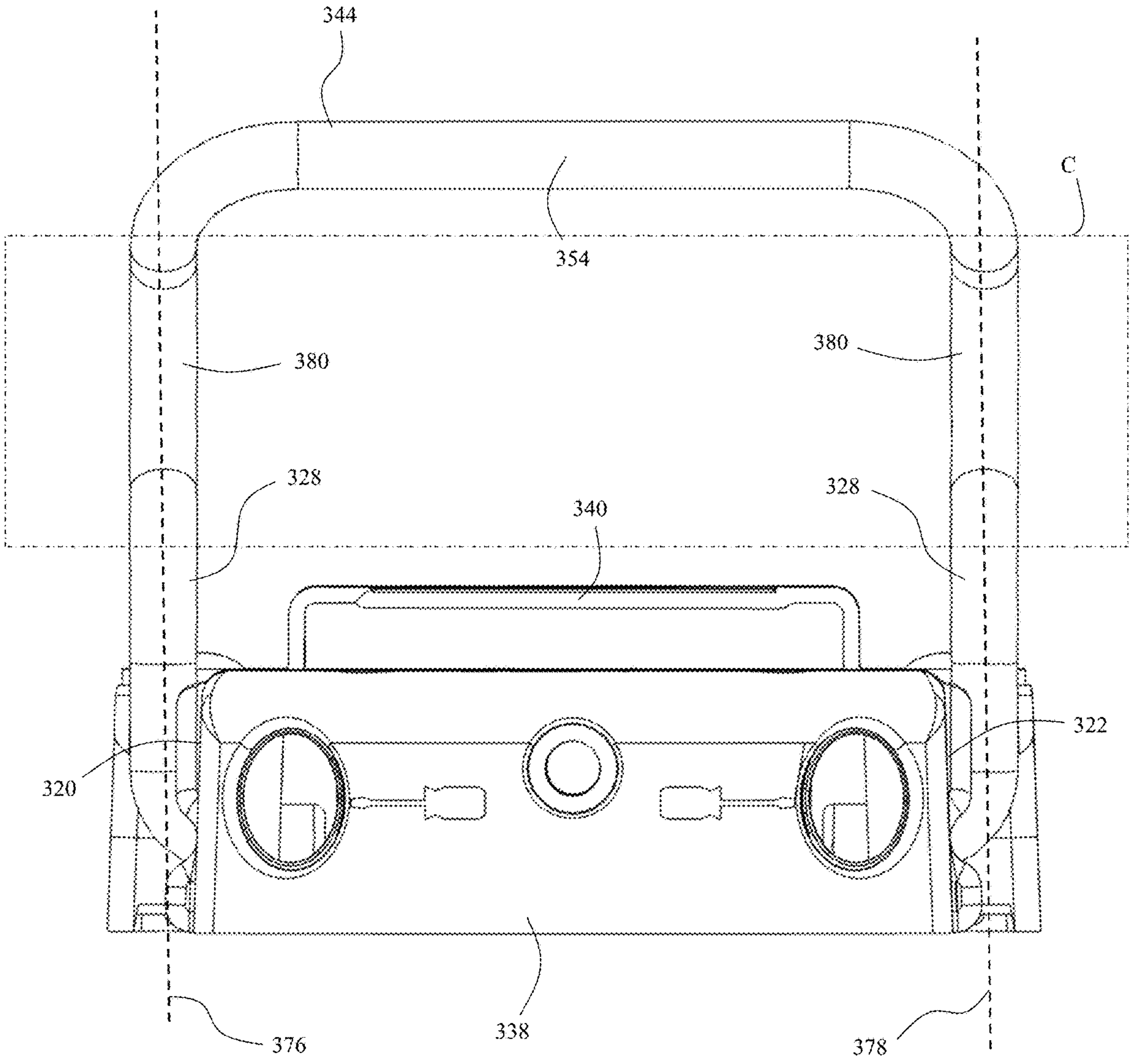
FIG. 22 is a top view of the button of FIG. 20.

A set of scooped or curved portions 380 can be positioned in the support arm 344 between the side bar portions 328 and the width portion 354. As indicated in FIG. 22, the curved portions 380 can respectively lie in planes 376, 378 that are parallel to the side surfaces 320, 322 of the button body 338. Additionally, as shown in FIGS. 19 and 21, the curved portions 380 can each form a recessed profile of the arm 344 that, when the arm 344 is deployed, is vertically offset (e.g., offset downward by distance 382) relative to the horizontal (or substantially horizontal) top surface plane 384 of the straight side bar portions 328. In some embodiments, the side bar portions 328 may not be straight, and the recessed profile at the curved portions 380 can be vertically offset downward from a horizontal plane tangent to the highest point proximal to the opening (e.g., 214) in which the arm 344 is coupled to the button body 338. The recessed profile can beneficially be used to support and retain objects that are long, narrow, cylindrical, tubular, etc., such as a pipe or tube that lies in a horizontal plane extending across the recessed profiles above the curved portions 380 and between the width portion 354 and body 338. An example object C is shown in broken lines in FIGS. 21-22. As shown in the figures, object C can rest upon the arm 344 without rolling off of the arm 344, despite its round profile, due to the recessed profile receiving a bottom portion of the object C. Thus, the recessed profile of the arm 344 can help retain objects that might be susceptible to rolling off of arm 144.

The curved portions 380 and width portion 354 can also form a raised distal portion of the arm 344, as shown in FIG. 21. A horizontal plane 386 tangent to (or about parallel to a horizontal plane tangent to) the top surface of the width portion 354 can be vertically offset (e.g., by distance 388) from the horizontal (or substantially horizontal) top surface plane 384. Accordingly, the curved portions 380 can position the width portion 354 to act as a rail or raised distal support that can help prevent an object (e.g., object C) from moving distally off of the arm 344 due to the distal end (at portion 354), when deployed, being vertically higher than the proximal end (e.g., at side bar portions 328) and thereby mechanically interfering with and forming a barrier against sliding or rolling of the object in a distal direction. Additionally, in conjunction with the body 338 and the recessed profile described above, the arm 344 can form a side cupping profile (as defined between plane 386 and the top surfaces of the arm 344 and outer axially-facing surface of body 338) that can receive and support objects of various sizes across both side portions of the arm 344 (i.e., across portions 328 and 380). The loop shape of the arm 344 and body 338 can also define an aperture through the arm 344, as seen in FIG. 22. In some embodiments, the arm 344, body 338, or plate 340 can define a bottom surface or a support portion that extends under the aperture through the arm 344 and that limits downward movement of objects through the aperture. For example, the plate 340 can provide a bottom support for a cup or other object placed in the aperture of the loop of the arm 344.

The size of a support arm 344 can be sufficient that the three main portions of the support arm 344 (e.g., 354 and each pair of 328/380) allow the support arm 344 to rotate to the storage or collapsed configuration (FIGS. 18-19) with the width portion 354 positioned above the top surface of the button body 338. In other words, the entire thickness of the support arm 344 can lie between two parallel planes that are defined by the outward and inward axially-facing surfaces (i.e., corresponding to 156 and 1600) of the body 338.

Additionally, the arm 344 is shown with a substantially circular cross-sectional profile, but its cross-sectional profile can also or alternatively be tubular, square, triangular, combinations thereof, or similar shapes. A curved profile (e.g., circular) can facilitate easier insertion and removal of objects from the arm 344, and a sharper or more angular profile can facilitate more secure retention of items.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A ladder, comprising:

a first assembly, including:

a first pair of rails spaced apart from each other;

a first set of rungs coupled to and extending between the first pair of rails;

a first pair of hinge portions coupled to the first pair of rails;

a second assembly, including:

a second pair of rails spaced apart from each other;

a second pair of hinge portions coupled to the second pair of rails;

wherein the first pair of hinge portions and the second pair of hinge portions are pivotally coupled to each other to form a pair of hinges rotatable about a pivot axis; and a pair of hinge button assemblies, wherein each hinge button assembly of the pair of hinge button assemblies includes:

a first button body coupled with a hinge of the pair of hinges; and a second button body fixed to and movable with the first button body in response to movement of the first button body relative to the hinge, the second button body having a first axially-facing surface being partially spaced axially outward from a second axially-facing surface of the first button body by at least one gap configured to receive an object hanging from the second button body, wherein the first axially-facing surface and the second axially-facing surface face each other.

2. The ladder of claim 1, wherein:

the pair of hinge button assemblies is movable between a first axial position along the pivot axis and a second axial position along the pivot axis;

the first assembly is rotatable relative to the second assembly while the pair of hinge button assemblies is in the first axial position;

the first assembly is prevented from rotation relative to the second assembly while the pair of hinge button assemblies is in the second axial position;

each hinge button assembly further comprises a pivot pin coupled to the first button body, a bracket coupled to the pivot pin, and at least one locking pin coupled to the bracket;

the first pair of hinge portions includes a first opening and the second pair of hinge portions includes a second opening;

the first assembly is prevented from rotation relative to the second assembly by the at least one locking pin being positioned in the first opening and in the second opening; and the first assembly is rotatable relative to the second assembly while the at least one locking pin is removed from the first opening and from the second opening.

3. The ladder of claim 1, wherein the second button body comprises a substantially flat outward-facing surface parallel to the first button body.

4. The ladder of claim 1, wherein the second button body is integrally formed with the first button body.

5. The ladder of claim 1, wherein the at least one gap forms a slot elongated along a direction perpendicular to the pivot axis.

6. The ladder of claim 1, wherein the at least one gap includes two open ends.

7. The ladder of claim 1, wherein the at least one gap at least opens upward while the pair of hinges is positioned over the first pair of rails and the second pair of rails.

8. The ladder of claim 1, wherein the second button body is directly coupled to the first button body at opposite ends of the second button body.

9. The ladder of claim 1, wherein the first axially-facing surface is substantially parallel to the second axially-facing surface.

10. The ladder of claim 1, wherein the second button body is configured to support the object when the object is hanging on the second button body and at least partially positioned in the at least one gap.

11. The ladder of claim 1, wherein the second button body comprises a plate.

12. A ladder, comprising: a first assembly, including:

a first pair of rails spaced apart from each other;

a first set of rungs coupled to and extending between the first pair of rails;

a first pair of hinge portions coupled to the first pair of rails and defining a first opening;

a second assembly, including:

a second pair of rails spaced apart from each other;

a second pair of hinge portions coupled to the second pair of rails and defining a second opening;

wherein the first pair of hinge portions and the second pair of hinge portions are pivotally coupled to each other to form a pair of hinges rotatable about a pivot axis; and a pair of retainers, each retainer of the pair of retainers being movable between a respective first axial position along the pivot axis and a respective second axial position along the pivot axis;

wherein each retainer of the pair of retainers includes:

a body having a body surface facing axially outward from the pair of hinges, the body surface having an entirely flat portion;

a plate structure integrally formed with the body on at least two ends of the plate structure on opposite sides of the entirely flat portion of the body surface, wherein the plate structure is spaced axially outward from the body surface by at least one elongated gap, wherein the at least one elongated gap is parallel to the entirely flat portion of the body surface and configured to receive and support a tool hanging from the plate structure;

a pivot pin coupled to the body on a side of the body opposite the plate structure;

a bracket coupled to the pivot pin; and at least one locking pin coupled to the bracket;

wherein the first assembly is rotatable relative to the second assembly while the pair of retainers is in the first axial positions and the at least one locking pin is removed from the first opening and from the second opening; and wherein the first assembly is prevented from rotation relative to the second assembly by the pair of retainers while the pair of retainers is in the second axial positions and the at least one locking pin is positioned in the first opening and in the second opening.

13. The ladder of claim 12, wherein the first pair of rails and the second pair of rails are lockable relative to each other, via the at least one retainer, in a substantially coplanar orientation.

* * * * *